United States Patent
Sherwood et al.

(10) Patent No.: US 7,799,363 B2
(45) Date of Patent: *Sep. 21, 2010

(54) PROTEIN BEVERAGE AND PROTEIN BEVERAGE CONCENTRATE AND METHODS OF MAKING THE SAME

(75) Inventors: Shawn Sherwood, Carlsbad, CA (US); David A. Jenkins, Carlsbad, CA (US); Steven A. Rittmanic, Chandler, AZ (US)

(73) Assignee: NEXT Proteins, Inc., Carlsbad, CA (US)

( * ) Notice: Subject to any disclaimer, the term of this patent is extended or adjusted under 35 U.S.C. 154(b) by 787 days.

This patent is subject to a terminal disclaimer.

(21) Appl. No.: 11/683,380

(22) Filed: Mar. 7, 2007

(65) Prior Publication Data

US 2007/0148307 A1    Jun. 28, 2007

Related U.S. Application Data

(63) Continuation-in-part of application No. 11/215,524, filed on Aug. 30, 2005, now Pat. No. 7,205,018, and a continuation-in-part of application No. 11/373,412, filed on Mar. 10, 2006, which is a continuation-in-part of application No. 11/215,524.

(60) Provisional application No. 60/617,146, filed on Oct. 7, 2004, provisional application No. 60/648,914, filed on Jan. 31, 2005, provisional application No. 60/648,974, filed on Jan. 31, 2005.

(51) Int. Cl.
   *A23L 2/54* (2006.01)
(52) U.S. Cl. .................. 426/583; 426/477; 426/656; 426/590; 426/599; 426/519; 426/521
(58) Field of Classification Search .......... 426/583, 426/656, 590, 599, 519, 521, 477
   See application file for complete search history.

(56) References Cited

U.S. PATENT DOCUMENTS

| | | | |
|---|---|---|---|
| 3,846,560 A | 11/1974 | Hempenius et al. | |
| 3,876,806 A | 4/1975 | Hempenius et al. | |
| 4,478,855 A * | 10/1984 | Dahlen et al. | 426/41 |
| 4,790,998 A | 12/1988 | Swartz | |
| 4,804,552 A | 2/1989 | Ahmed et al. | |
| 5,520,948 A | 5/1996 | Kvamme | |
| 5,641,531 A | 6/1997 | Liebrecht et al. | |
| 6,028,107 A | 2/2000 | Waugh | |
| 6,060,103 A | 5/2000 | Dunagan | |
| 6,106,874 A | 8/2000 | Liebrecht et al. | |
| 6,261,589 B1 | 7/2001 | Pearson et al. | |
| 6,403,129 B1 | 6/2002 | Clark et al. | |
| 6,432,929 B1 | 8/2002 | Stone | |
| 6,485,762 B1 | 11/2002 | Rizvi et al. | |
| 6,623,781 B2 | 9/2003 | Rizvi et al. | |
| 6,740,344 B2 | 5/2004 | Murphy et al. | |
| 6,761,920 B1 | 7/2004 | Kaplan | |
| 6,866,877 B2 | 3/2005 | Clark et al. | |
| 7,205,018 B2 * | 4/2007 | Sherwood et al. | 426/583 |
| 2002/0127317 A1 | 9/2002 | Hotchkiss et al. | |
| 2003/0099753 A1 | 5/2003 | Yang | |
| 2003/0113408 A1 | 6/2003 | Clark et al. | |
| 2005/0003054 A1 | 1/2005 | McCampbell | |
| 2005/0106218 A1 | 5/2005 | Ward et al. | |
| 2005/0106305 A1 | 5/2005 | Abraham et al. | |
| 2005/0233046 A1 * | 10/2005 | Krawczyk et al. | 426/573 |
| 2006/0083793 A1 | 4/2006 | Gardiner et al. | |
| 2009/0087495 A1 * | 4/2009 | Toyomura et al. | 424/520 |

FOREIGN PATENT DOCUMENTS

| EP | 0852 468 B1 | 4/1997 |
|---|---|---|
| FR | 6443 M | 4/1967 |
| WO | WO 2006/058083 A2 | 6/2006 |

OTHER PUBLICATIONS

V.H. Holsinger, "Fortification of Soft Drinks with Protein from Cottage Cheese Whey", Adv. Exp. Med. Biol. v. 105:735-47 (1978).
Kudryavtseva et al. Carbonated Whey Beverage, Leningradskii Tekh, Inst. Kholodil'noi Promyshlennosti, Leningrad, USSR, Molochhnaya Promyshlennost 1981, No, 5, 45-46 (abstract).

* cited by examiner

*Primary Examiner*—Helen F Pratt
(74) *Attorney, Agent, or Firm*—Bernard L. Kleinke; Duckor Spradling Metzger & Wynne

(57) ABSTRACT

An improved protein beverage which may provide a relatively high protein content, ranging from about 0.01% by weight to about 15% by weight, while optionally employing a carbonation concentration between about 0.1 volumes of carbonation (per volume of liquid drink) to about 6 volumes of carbonation. Preferably the protein is a protein, such preferably as whey protein, or others. The protein beverage may contain juice and/or an additive which provides energy generation enhancement. The protein beverage may be heat treated to inactivate pathogenic microbes in the presence of the carbonation which may be used to provide taste and mouth feel for the drink. Typically, the treatment for pathogenic microbe inactivation is carried out in the individual package used for storage and handling of the protein drink. The protein beverage may be prepared from a protein beverage concentrate, which may be in the form of a syrup concentrate or a powder concentrate.

116 Claims, No Drawings

PROTEIN BEVERAGE AND PROTEIN BEVERAGE CONCENTRATE AND METHODS OF MAKING THE SAME

RELATED APPLICATIONS

This application is a Continuation-In-Part Patent Application of U.S. patent application Ser. No. 11/215,524, filed Aug. 30, 2005, now U.S. Pat. No. 7,205,018, and entitled "Carbonated Protein Drink and Method of Making," which is related to U.S. Provisional Patent Application Ser. No. 60/617,146, filed Oct. 7, 2004, and entitled: "Carbonated Whey Protein Beverage;" U.S. Provisional Patent Application Ser. No. 60/648,914, filed Jan. 31, 2005, and entitled: "Carbonated Aqueous Whey Protein Beverage and Method of Making Same;" and, U.S. Provisional Patent Application Ser. No. 60/648,974, filed Jan. 31, 2005, and entitled: "Dry Carbonated Whey Protein Beverage and Method of Making Same." This Application is a Continuation-In-Part Patent Application of U.S. patent application Ser. No. 11/373,412, filed Mar. 10, 2006, which is a Continuation-In-Part Patent Application of U.S. patent application Ser. No. 11/215,524, filed Aug. 3, 2005, now U.S. Pat. No. 7,205,018. Priority is claimed under U.S. patent application Ser. Nos. 11/215,524 and 11/373,412, which claimed priority under each of the Provisional Patent Applications recited above, and each of these Patent Applications is hereby incorporated by reference in its entirety.

BACKGROUND OF THE INVENTION

1. Field of the Invention

The present invention pertains to a protein beverage and protein beverage concentrate, and to methods of making the protein beverage and protein beverage concentrate.

2. Brief Description of the Background Art

This section describes background subject matter related to the disclosed embodiments of the present invention. There is no intention, either express or implied, that the background art discussed in this section legally constitutes prior art. Moreover, this brief description is not intended to fully describe the subject matter of this art, the reader is invited to more thoroughly examine the background to better understand what is disclosed.

Carbonated dairy products have been highly sought after, and several different kinds of products have been developed. One of the more serious obstacles to be overcome is production of a highly carbonated drink where, for example, the dissolved carbon dioxide gas at room temperature is at least half of the volume of the liquid product it is dissolved in without incurring separation out or precipitation of the dairy protein from the liquid during manufacture and handling, shipping and storage. In addition to manufacturability and shelf life, the taste of previous carbonated dairy products may generally have been adversely affected by the kind of proteins present in combination with the carbonation.

Milk contains two major protein fractions, casein, which may provide about 80% by weight of the total protein, and whey protein, which may provide about 20% by weight of the total protein. The whey protein fraction is the protein fraction which may remain soluble when the casein fraction is coagulated (such, for example, as by either enzyme or acid) and separated as cheese curd. Whey protein may include several protein fractions, including, for example, β-lactoglobulin, α-lactoglobulin, Lactalbumin, immunoglobulins (such as IgG1, IgG2, IgA, and IgM, for example), lactoferrin, glycomacropeptides, and lactoperoxidase.

Compared to casein and soy, whey proteins may be highly soluble. Whey proteins may be the least soluble at typically about pH 4.5 to about pH 5.5, which may be the isoelectric point (the pH at which the net electrical charge is zero) for whey protein. In higher acid systems with a pH less than about 4.5, such as in many carbonated beverages, the acid solubility of whey proteins may be especially important; however, protein precipitation may occur during the mixing period when the pH of the whey protein, which typically has a pH of about 6 to about 7, transitions through the zone of isoelectric points. Protein solubility may be affected by heat and therefore the elevated temperatures experienced during pasteurization may also negatively affect solubility and fluidity resulting in protein precipitation or gelation.

Whey protein may have a higher biological value and/or protein digestibility corrected amino acid score (PDCAAS) than casein. The physical properties of whey proteins in the digestive tract may be quite distinct from the properties of casein. Caseins may form curds within the stomach, which curds may be slow to exit from the stomach and which curds may increase their hydrolysis prior to entering the small intestine. Alternatively, whey proteins may reach the jejunum almost immediately; however their hydrolysis within the intestine may be slower than that of caseins, so their digestion and absorption may occur over a greater length of the intestine.

The protein efficiency ratio (PER) of a protein source measures the weight gain of young animals per grain of protein eaten over a given time period. Any protein having a PER of 2.5 is considered good quality. Whey protein is considered to be a nutritionally excellent protein, as it has a PER of 3.2. Casein has a PER of 2.5, while many commonly used proteins have a PER of less than 2.5, such as soy protein (PER 2.2), corn protein (PER 2.2), peanut protein (PER 1.8), and wheat gluten (PER 0.8). The higher PER of whey protein may be due in part to the high level of sulfur-containing amino acids in whey protein. Such higher level may contribute to whey protein's ability to enhance immune-function and antioxidant status.

Whey protein is a rich source of branched chain amino acids (BCAAs), containing the highest known levels of any natural food source. BCAAs are important for athletes, since, unlike the other essential amino acids, they are metabolized directly into muscle tissue and are the first amino acids used during periods of exercise and resistance training. Leucine may be important for athletes as it may play a key role in muscle protein synthesis and lean muscle support and growth. Research suggests that individuals who exercise benefit from diets high in leucine and may have more lean muscle tissue and less body fat than individuals whose diet contains lower levels of leucine. Whey protein isolate may have approximately 45% by weight more leucine than soy protein isolate.

Whey protein is available in several forms, with preparations which may range from about 1% to about 99% whey protein. Whey protein preparations may be in an aqueous form created by the removal of casein, but often takes several other forms, such as, for example, but not by way of limitation, a whey protein extract, whey protein concentrate, whey protein isolate, or whey protein hydrolysate.

Whey protein concentrate may be prepared by removing sufficient non-protein constituents from whey by membrane filtration, so that the finished dry product may be selected to contain whey protein at a given concentration which may range from about 25% by weight to about 89.9% by weight protein.

Whey protein isolate may be obtained by removing sufficient non-protein constituents from whey by membrane filtration or ion exchange absorption, so that the finished dry product may contain about 90% by weight or more whey protein, and little, if any, fat, cholesterol, or carbohydrates (e.g., lactose). Prior to concentration and spray drying, aqueous whey protein isolate may have a whey protein concentration of about 1% by weight to about 35% by weight, and may also be essentially free of fat, cholesterol, and carbohydrates.

Whey protein hydrolysate is a whey protein preparation which may have been subjected to enzymatic digestion with a protease enzyme or limited acid hydrolysis, or a suitable mechanical breakage of peptide bonds to form smaller peptides and polypeptides, to form smaller peptides and polypeptides. The protein concentration of the whey protein hydrolysate may be dependent upon the starting material. For example, a whey protein hydrolysate prepared from an 80% by weight whey protein concentrate may have an 80% by weight protein concentration, and a whey protein hydrolysate prepared from a 90% by weight whey protein isolate may have a 90% by weight protein concentration. Not all hydrolyzed whey proteins may behave alike in a food formulation, and thus one hydrolyzed whey protein may not be interchangeable with another. The functional and biological properties of whey protein hydrolysates may vary depending upon factors, such as degree of hydrolysis and which protease enzyme is used for hydrolysis.

Although hydrolysis of whey protein may lead to increased solubility, it may also negatively impact the taste. Whey protein typically has a fresh, neutral taste which may allow it to be included in other foods without adversely affecting the taste. However, hydrolysis of whey protein may result in a very bitter taste, which may impose a practical limit on the amount of whey protein hydrolysate that can be used in a food product. Therefore, a high protein beverage made with whey protein hydrolysate may require a large amount of sweeteners, or bitter masking agents to overcome the bitter taste. However, such a large amount of sweetener may not be desirable to many consumers or the bitter aftertaste of the high protein beverage may be difficult or impossible to mask to a satisfactory extent for some applications.

Whey protein contains all of the essential amino acids, and therefore, is a high quality, complete source of protein, where complete means that whey protein contains all the essential amino acids for growth of body tissues. Since whey protein is available in forms containing little fat and carbohydrates, it may be a particularly valuable source of nutrition for athletes and for individuals with special medical needs (e.g., lactose intolerant individuals), and may be a valuable component of a diet program. Further, since whey protein may contain biologically active proteins such as the immunoglobulins, lactoperoxidase, and lactoferrin, whey protein may provide advantages over other protein sources such as soy protein.

In an effort to increase the availability and use of whey protein, efforts have been made to include whey protein drinks among currently available dairy protein drinks. In particular, efforts have been made to include whey protein as a protein source in carbonated beverages. Unfortunately, the carbonation process may generally result in destabilization of whey protein, resulting in foaming and/or gelling problems under certain conditions. As a result, the amount of whey protein that has been included in carbonated beverages has been severely limited.

An article by V. H. Holsinger in Adv. Exp. Med. Biol. 1978; 105:735-47, titled: "Fortification of soft drinks with protein from cottage cheese whey", describes preparation of cottage cheese whey protein concentrates which have the solubility, stability, and flavor to make them suitable for fortification of soft drinks and related products. Carbonated beverages prepared with conventional beverage ingredients and containing up to 1% by weight of the total beverage of added whey protein are said to have maintained clarity, color, and flavor during 203 days of storage at room temperature. Clarity of 1% protein solutions at a pH of 2-3.4 is said to be unimpaired by heating for 6 hours at 80 degrees (without specifying ° C. or ° F.), but some structural change was said to have occurred, since an average of 37% of the protein is said to have precipitated on shifting the pH to 4.7.

Clouding or creaming agents useful for still or carbonated beverages, especially acid types are described in U.S. Pat. No. 4,790,998, issued to Marsha Schwartz on Dec. 13, 1988, and entitled: "Beverage Cloud Based On A Whey Protein-Stabilized Lipid". The composition of matter described comprises a whey protein-stabilized lipid emulsified in an acidic aqueous solution. The important features of the patented whey protein-stabilized lipid are said to include the balancing of the lipid system, the use of whey protein at pH levels of less than 4.5, and beating and homogenizing the solution to achieve acid emulsification stability. All ingredients are said to be natural, i.e., unmodified from the form typically found in nature.

A Russian abstract by Kudryavtseva et al., in Molochnaya Promyshlennost 1981; 5: 45-46, with an English translated title of: "Carbonated whey beverage", vaguely describes a method for the manufacture of a carbonated beverage involving the following major steps: filtration of tvorog whey containing less than 1.5% protein and 0.2% fat and with a titratable acidity of less than 75 degrees Thorner, holding for up to a day at 6-8° C., heating at 90-95° C. and holding for 15 minutes, cooling to 60° C., centrifuging, addition of unnamed ingredients, cooling to 4-6° C. and injection of $CO_2$. The Abstract then suggests the product can be bottled in narrow-neck bottles and closed with crown cork closures. Subsequent storage is at less than 8° C.

Tvorog is a Russian soft farmer's cheese. Tvorog is commonly made by allowing raw milk to sour naturally. However, it may also be made by curdling raw milk by the addition of a starter bacterial culture or an acid. Once curdled, the tvorog may be filtered to separate the tvorog curds from the tvorog whey, which typically contains whey protein, fat and lactose.

U.S. Pat. No. 4,804,552 to Ahmed et al., issued Feb. 14, 1989, and entitled: "Carbonated Liquid Dairy Product and Method of Production Thereof" describes a method of carbonating a liquid dairy product to a level of "at least" 1.5 volumes of carbon dioxide dissolved in 1.0 volume of liquid dairy product while not destabilizing the liquid dairy product. The liquid dairy product is heated to a temperature of at least 160° F. for a time not in excess of 30 minutes, followed by cooling to a temperature of less than about 50° F. The cooled liquid is then subjected to pressurized carbon dioxide to carbonate the dairy product to provide taste and mouth feel. The product is then packaged in closed containers capable of substantially retaining the degree of carbonation. The carbonated dairy product is said to be buffered to a pH of at least 4.0 while being highly carbonated but not destabilized.

U.S. Pat. No. 6,403,129, to Clark et al., issued Jun. 11, 2002, and entitled: "Carbonated Fortified Milk-Based Beverage And Method Of Making Carbonated Fortified Milk-Based Beverage For The Supplementation Of Essential Nutrients In The Human Diet", discloses dairy or non-dairy based fortified carbonated beverage solutions that supply nutrients in the human diet. The beverage described is said to have carbonation to enhance taste, improve body and mouth-feel and aid in the stabilization of milk protein such as Lactalbumin and Casein.

U.S. Pat. No. 7,041,327 B2, to Hotchkiss et al., issued May 9, 2006, and entitled "Carbon Dioxide as an Aid in Pasteurization", describes processes to inhibit or reduce the growth of bacteria and other pathogens in a liquid by adding carbon dioxide to the liquid, and thermally inactivating the bacteria and other pathogens. The process is said to be applicable to a wide variety of fluids, liquids, semi-solids and solids. Prior to or simultaneously with thermal inactivation carbon dioxide ($CO_2$) is added to the product by sparging or bubbling, preferably to obtain levels of about 400-2000 ppm. At this level of $CO_2$, the amount of microbial death that occurs during heating in a normal pasteurization (HTST) process is said to be increased by 10% to 90% over thermal inactivation carried out without the addition of $CO_2$ prior to the thermal inactivation step. After completion of the thermal inactivation process, the free $CO_2$ is said to be removed.

U.S. Pat. No. 6,761,920 to Jeffrey Kaplan, issued Jul. 13, 2004, and entitled: "Process For Making Shelf-Stable Carbonated Milk Beverage", describes an aerated or carbonated milk product drink made using a method which includes pre-heating, pressurized ultra-heat treating, subsequent carbonation with a gas or gases under pressure, and packaging into a container. The method of producing the shelf-stable carbonated milk product comprises injecting under pressure carbon dioxide gas or a mixture of gases into the milk product at low temperature of less than 10 degrees centigrade and high pressure of from 50 KPa to 200 KPa. In a typical process, the milk product is pre-heat treated at a temperature of 80° C. to 138° C., followed by ultra-heat treatment from about 138° C. to about 150° C. in a holding tank, where it is held at a pressure of 700 KPa or an appropriate pressure. The carbonation may be achieved by direct injection of sterilized, purified carbon dioxide gas in a holding receptacle, or may be injected in line. Preferably the carbonation process is carried out at 2° C.±14° C. Then the carbonated liquid is transferred to a holding tank, where it is maintained at a pressure of 450 KPa and a temperature of 2° C. to 6° C.

In the U.S. Pat. No. 6,761,920, it is said that if, for some reason, the amount of carbonation of the pre-heated ultra heat treated milk product is insufficient, the product may be diverted to be reprocessed through the carbonater in a return loop to a holding tank to be re-pasteurized to be within the specification. After carbonation, the product is conveyed to a packaging station for packaging into sterile containers. The pH of the product is said to be preferentially maintained at 4.0 to 5.7 during packaging operations, depending on the product. After packaging the milk product into individual containers, it is said that the milk may be further sterilized by non-toxic radiation or pasteurization; however, no enabling description of how this would be done is provided.

U.S. Pat. Nos. 6,835,402 B1 and 6,866,877 B2 to Clark et al., issued Dec. 28, 2004 and Mar. 15, 2005, entitled, respectively: "Carbonated Fortified Milk-Based Beverage and Method for Suppressing Bacterial Formation in the Beverage" and "Carbonated Fortified Milk-Based Beverage And Method For Suppressing Bacterial Growth In The Beverage", describes dairy or non-dairy based fortified carbonated beverage solutions that are said to supply essential nutrients in the human diet. In addition to describing the composition of a beverage, the patent discloses a method of using carbonization to reduce bacterial counts and reduce degradation of essential nutrients in mill-based beverages with or without pasteurization. In one embodiment, $CO_2$ is added pre-pasteurization to eliminate or effectively reduce the growth of bacterial colonies in the beverage and reduce degradation of nutrients if UHT pasteurization is used. If $CO_2$ is added pre-pasteurization, it is said that $CO_2$ must be reintroduced, since pasteurization disseminates most $CO_2$ present. This is done by in-line addition of $CO_2$ after the beverage's temperature is brought down from about 185° F.-215° F. to about 40° F. It is said that the $CO_2$ concentration in the final product is preferably from about 500 ppm to about 3,000 ppm. 1,000 ppm is said to be about 0.5 volumes of carbonation per volume of liquid beverage solution, so that the final product contains about 0.25 volumes to about 1.5 volumes of carbon dioxide per volume of liquid beverage solution.

One type of carbonated dairy product for which there is increasing demand is a carbonated dairy product that provides both high juice and high protein content. The problem of protein precipitation and separation out during manufacturing, shipping, and storage, discussed above for a highly carbonated high protein drink, may be compounded when the beverage contains an additional component, such as juice. Methods are known in the alt for attempting to overcome the precipitation of protein from juice beverages. However, most of these methods involve the use of stabilizers.

Fiber or other carbohydrates may be added as a protein stabilizing agent, such as pectin, cellulose gum, xanthan gum, gum arabic, carageenan, guar gum, dextrin, dextrose monohydrate, and polydextrose. While stabilizers can help prevent protein precipitation, they may have the disadvantage of increasing the viscosity of the drink due to cross-linking with naturally present calcium cations. This increased viscosity may be undesirable as it may lead to a beverage having poor organoleptic properties for at least some applications. The range of amount of stabilizer which may be used may be quite narrow. For example, at a pectin concentration of below 0.06% by weight, sedimentation may be a significant problem, whereas above it, the viscosity of the beverage may be undesirably high. The ideal amount of stabilizer must be experimentally determined for each beverage formula, and may need to be adjusted from one batch to the next. Thus, a beverage formula which does not include a protein stabilizer but generates a beverage with good protein solubility is desirable for many applications.

U.K. Patent GB 2,335,134 to Burke, published Jun. 19, 2002, entitled: "A beverage", discloses a carbonated beverage comprising: from 5 to 20 weight % of fruit juice; carbohydrate in an amount of from 2 to 6 grams per 100 milliliter; and a soluble whey protein hydrolysate in an amount of from 5 to 20 grams per liter; the beverage containing carbon dioxide in an amount of from 4 to 6 grams per liter and having a pH of less than 3.5. The pH is adjusted with citric acid and malic acid. Protein precipitation is allegedly avoided by adjusting the amount and nature of the carbohydrate used. The carbohydrate source is stated to be most preferably dextrose monohydrate.

U.S. Pat. No. 7,101,585 B2, to Shen et al., issued Sep. 5, 2006, entitled: "Ultra High Pressure Homogenization Process for Making a Stable Protein Based Acid Beverage" describes a process for preparing a stable suspension of an acid beverage, wherein a hydrated protein stabilizing agent (A) and a flavoring material (B) are combined as a preblend (I) and combined with either a slurry of a homogenized protein material (C) or a homogenized preblend (II) of a hydrated protein stabilizing agent (A) and a slurry of a protein material (C) to form a blend and pasteurizing and homogenizing the blend. The homogenization of the blend is carried out in two stages comprising a high pressure stage of from 8000-30,000 pounds per square inch and a low pressure stage of from 300-1,000 pounds per square inch. The acid beverage composition has a pH of from 3.0 to 4.5. This beverage contains juice, but is not carbonated. Pectin is added as a stabilizer.

Published Patent Application US 2003/0099753 A1 of Yang, published May 29, 2003, describes a fruit juice based beverage composition containing a protein selected from the group consisting of whey protein isolate and a combination of whey protein isolate and whey protein hydrolysate; a carbohydrate selected from the group consisting of sucrose, fructose, high fructose corn syrup 42 (HFCS 42), HFCS 55, combination of sucrose, fructose, HFCS 42, and HFCS 55, and combinations of maltodextrin with another carbohydrate selected from the group consisting of sucrose, fructose, HFCS 42, and HFCS 55; an edible acid selected from the group consisting of citric acid, phosphoric acid, combinations of citric acid and phosphoric acid, and combinations of malic acid with another edible acid selected from the group consisting of citric acid and phosphoric acid; a fruit juice or combinations of fruit juices; various vitamins and minerals; and optional fibers and flavors and a process for making such composition. The composition containing the above ingredients are asserted to be clear, have a pH of about 4.0 or less, and have a viscosity of less than about 40 centipoises. Protein stabilizing agents are used, including pectin.

U.S. Pat. No. 4,478,858 to Dahlen et al., issued Oct. 23, 1984, entitled: "Protein containing fruit drink and process for the manufacture thereof", discloses a protein containing fruit juice drink comprising a fruit juice portion of 10-85% containing a citrus juice portion, a milk raw material portion of 90-15% by weight in which the milk raw material portion comprises whey proteins in an amount of 0.5-10% by weight of the finished product, and, as a sweetener, a hydrolyzed lactose, made of substantially pure lactose prepared from whey or a permeate from ultrafiltration of milk or whey, containing pure glucose and galactose derivative, which is alleged to act as a binder of the protein even in fruit drinks containing a citrus juice portion. The fruit drink may be manufactured in a concentrated form from a protein concentrate, concentrated fruit juice and/or fruit aromas and a concentrated hydrolysed lactose. A polysaccharide containing stabilizer may be added to the concentrate.

As is illustrated above, there are a number of different factors which need to be, or at least may be, considered in development of a carbonated protein and juice drink. At least one of the references appear to teach away from each other in regards to, inter alia, 1) the concentrations of protein which can be used in a carbonated protein drink, 2) the amount of carbonation which can be used (and still enable a shelf-stable beverage), and 3) the pH at which various protein-containing carbonated beverages are shelf-stable.

There is also considerable lack of detail in the processing method steps described in at least some of the foregoing references, to the extent that one of skill in the art may not be enabled to produce a desired carbonated protein drink after experimentation, in view of the description. Inactivation of microbes, such as by thermal processing, after carbonation of the beverage may be a problem for at least some applications, requiring subsequent "recarbonation" to ensure that the beverage has the proper taste and mouth feel.

DETAILED DESCRIPTION OF CERTAIN EMBODIMENTS

As a preface to the detailed description, it should be noted that, as used in this specification and the appended claims, the singular forms "a", "an", and "the" include plural referents, unless the context clearly dictates otherwise.

The terms "about" and "approximately" as used herein, indicate that the precision of the nominal value presented is ±10%.

The protein drink composition of the disclosed embodiments of the present invention, produced using the method described below, provides a high protein content (relative to previously described drinks) where the amount of carbonation may also be high. In addition, while the protein drink may be heat treated to inactivate microbes, the final product exhibits storage shelf-stability which is unexpectedly long for such a product.

We have developed an improved protein beverage/drink, which contains a high protein concentration compared with protein concentrations of drinks previously known in the industry. The typical concentration of protein ranges from about 0.01% by weight to about 15% by weight, more typically the protein concentration ranges from about 2% by weight to about 15% by weight, with the most typical concentration ranging from about 5% by weight to about 8% by weight.

In one embodiment, the protein is essentially free from caseinate. Typically, the essentially caseinate free protein is whey protein, of the kind previously described herein. More typically, the essentially caseinate free protein is a whey protein which may be derived from whey protein isolate or whey protein concentrate, although other whey protein preparations may be used, such as, for example, but not by way of limitation, a whey protein extract or a whey protein hydrolysate. The whey protein isolate may typically be a dry whey protein isolate, with a whey protein concentration of about 90% by weight or more of protein, or an aqueous whey protein isolate, with a whey protein concentration of about 1% by weight to about 40% by weight. The whey protein concentrate may typically be a dry whey protein concentrate with a concentration of about 25% by weight to about 89.9% by weight protein. An aqueous form of whey may also be suitable. In addition, the total protein content can be increased by the addition of mixtures of proteins such as whey protein and other proteins such as soy proteins.

Whey protein is a protein fraction obtained from mammalian milk. Commercially available whey protein is typically derived from the milk of cows; however, whey protein may be derived from the milk of any mammal, such as, for example, but not by way of limitation, the milk of goats, sheep, buffalo, camel, black bear, llama, deer, kangaroo, pig, dog, rabbit, elephant, dolphin, donkey, horse, seal, or human. Alternatively, whey protein may be prepared by recombinant DNA technology, using molecular biology techniques commonly known in the alt.

In other embodiments, the protein may be any edible protein, other than whey protein, such as, for example, but not by way of limitation, casein, lactalbumin, serum albumin, glycomacropeptide, soy protein, rice protein, pea protein, canola protein, wheat protein, hemp protein, zein, flax protein, egg white protein, ovalbumin, gelatin protein, or any combination thereof.

In another embodiment, the protein is a combination of a whey protein, of the kind previously described herein, and an edible protein, other than whey protein, such as, for example, but not by way of limitation, casein, lactalbumin, serum albumin, glycomacropeptide, soy protein, rice protein, pea protein, canola protein, wheat protein, hemp protein, zein, flax protein, egg white protein, ovalbumin, or gelatin protein.

In any of the above embodiments, if a dry protein is used, such as, for example, a dry whey protein (e.g., isolate or concentrate) or a dry soy protein, the dry protein may be hydrated with water to prepare an aqueous protein solution. Typically the pH of the aqueous protein (isolate, concentrate, or hydrated) may be adjusted with an appropriate pH adjusting agent to match the pH of the beverage composition prior to mixing the protein with the beverage composition.

While not wishing to be bound by any present theory of action, it is presently believed that lowering the pH of the aqueous whey protein prior to addition to the beverage results in a carbonated protein beverage with superior organoleptic properties, by preventing or at least greatly reducing precipitation and gelling of the protein as it passes through the zone of isoelectric points. It is believed that prior art carbonated drinks did not attempt to move rapidly to the final pH and permitted the composition to dwell too long at low temperatures at or near the isoelectric point, thereby permitting much or all of the material to precipitate. With the inventors' discovery that this transient state of low solubility can be traversed before precipitation commences, practitioners can easily make these clear beverages with minimal testing.

Whey proteins have a high buffering capacity, and therefore this pH adjustment step tends to prevent the whey protein from buffering the acids of the beverage. Minimal or no pH adjustment may be necessary if the whey protein was acidified prior to being dried. We have determined that Inpro 90 HS™ heat stable 90% whey protein isolate, when reconstituted as a 10% aqueous solution has a pH of 2.9 to 3.3. This material is available from Vitalus Nutrition, Inc. of Abbotsford, British Columbia, V4X 2N1, Canada.

The typical concentration of juice in the finished beverage ranges from about 0% by weight to about 100% by weight. Typically the juice source may be fruit juice, vegetable juice, or a combination thereof, and may be added in whole, as a liquid, a liquid concentrate, a puree, or in another modified form containing one or more juice components. More typically, the juice may be depectinized, having had most of the pectins removed by enzymatic digestion, chromatography, precipitation, or by another method of juice depectinization. One method by which the juice may be depectinized is by treating it with pectinase enzyme, as described in detail in U.S. Pat. No. 6,620,452 B1. A depectinized juice may typically be a juice with a pectin content of about 0.05 weight % to about 0.25 weight %.

A single fruit juice, a single vegetable juice, fruit juice blends, vegetable juice blends, or fruit and vegetable juice blends may be used. Examples of a few of the many specific juices which may be used may include juice from alfalfa sprouts, apples, apricots, avocados, bamboo shoots, bananas, beans, bean sprouts, beets, berries of all types, cabbage, carrots, celery, cherries, cucumbers, currants, dates, figs, grapefruits, grapes, guava, kiwi, kumquat, lemons, limes, lychee fruit, mandarin, mango, melons of all types, nectarines, noni, oranges, papaya, passion fruit, peaches, pears, pineapples, plums, pomegranates, prunes, radishes, rhubarbs, rutabagas, seaweed, squash, tangelo, tangerines, tomatoes, and/or turnips; however, any type of juice may be used.

In some embodiments the protein beverage may be carbonated. The amount of carbonation which has been achieved while maintaining stability of the carbonated drink is unexpectedly high in view of the amount of protein present, with the amount of carbonation ranging from about 0.1 volumes of carbonation (per volume of liquid present in the beverage) to about 6 volumes of carbonation. More typically, the amount of carbonation present ranges from about 1.6 volumes to about 3.5 volumes, with the most typical concentration ranging from about 1.7 volumes to about 3.0 volumes.

Additives may be combined with the basic high protein beverage formulation to provide a "high energy" high protein beverage. For example, caffeine may be added to increase the level of circulating fatty acids in the body of a consumer of the beverage. This increase in circulation has been shown to increase the oxidation of these fuels, enhancing fat oxidation in general. Caffeine is well known as a means of enhancing fatty acid metabolism.

Another additive which may be included is magnesium. Magnesium may affect energy level and may be needed for more than about 300 biochemical reactions in the body. Magnesium may help regulate blood sugar levels, may promote normal blood pressure, and may support energy metabolism and protein synthesis.

A third additive may be added to affect energy level. The third additive may be citrulline malate. Citrulline is an amino acid which may play a role in nitrogen balance and metabolic processes. Supplemental citrulline malate is a salt form of the amino acid. Citrulline malate may improve aerobic performance and capacity by influencing lactic acid metabolism and reducing fatigue.

One or more of these effects on metabolism have been supported by evidence of an increase in the rate of oxidative adenosine triphosphate (ATP), which is essentially a "molecular currency" of intracellular energy transfer, and an increase in energy production during the exercise of muscles. These three additives which assist in the generation of energy, and combinations thereof, have been formulated into the high protein beverages described herein with little or no adverse effect on manufacturability or shelf storage life of the product.

The citrulline malate energy generating additive may have a very bitter taste in free form. We were surprised to discover that citrulline malate employed in a protein beverage of the kind described herein, provides a pleasant tasting beverage without the need to make a major modification from the recipes which do not contain the citrulline malate.

In addition to the high protein concentration, the protein beverage is essentially free from biologically pathogenic microbes such as bacteria and other spoilage pathogens of the kind which are monitored by the food industry in general. Due to the method used to inactivate the biologically pathogenic microbes, the protein beverage is essentially free from these pathogenic microbes for more than one year after packaging of the protein beverage into individual containers or servings and storage under shelf conditions which are standard in the unrefrigerated beverage industry. In addition to absence of biologically pathogenic microbes, there is little or no precipitation of protein, little or no thickening, flavor and color are maintained, and taste and mouth feel are maintained. In formulations which are designed to be transparent, without turbidity, the protein beverage is clear in color after this storage period. The recommended storage temperature is above freezing (32° F.) to about 75° F. Storage of the protein beverage at temperatures in excess of 100° F. for time periods of several months, such as about five months, are even possible without detriment to the taste and clarity.

In one embodiment, the protein drink may be treated to inactivate microbes in the presence of carbonation which may be used to provide taste and mouth feel for the drink, while maintaining the required minimal amount of carbonation to provide such taste and mouth feel.

The treatment to inactivate or remove microbes may include thermal processing by exposure to elevated temperature, aseptic packaging, carbonation, ozonation, radiation, ultra violet light, high pressure processing, filtration, membrane permeation, pulsed electric field, sonication, and combinations thereof. Typically, the treatment for microbe inactivation may be carried out in the individual serving package used for storage and handling of the carbonated protein drink. Testing has shown that for microbe inactivation carried out in the individual serving package, plate count for microbes is negligible and typically zero after a storage period of more than one year at temperatures ranging between 35° F. and about 75° F.

A protein beverage of an embodiment of the invention may further contain additional additives to: enhance the nutritional value (other than those particularly added for energy generation enhancement); aid in protection of the muscular system and joints during physical activity; add to the flavor value of the beverage; or, to provide a desired appearance of the beverage, provided that the additional agent is stable in the beverage. In an embodiment of the invention the protein beverage may be consumed as a meal replacement. Examples of additional agents which enhance nutritional value include nutrients such as vitamins, minerals (including calcium or a calcium derivative), herbal supplements, concentrated plant extracts, glucosamine, amino acids, fatty acids, and fiber. The examples include the following: vitamins such as vitamin A, vitamin C, and vitamin E, by way of example and not by way of limitation; minerals such as zinc, chromium, iron, calcium, magnesium (previously mentioned), and potassium, by way of example and not by way of limitation; herbal supplements such as ginseng, gingko biloba, saw palmetto, green tea, and *hoodia gordonii*, by way of example and not by way of limitation; amino acids, such as L-Glutamine, L-Arginine, Taurine, creatine, N-acetyl-cystine, N-acetyl-carnitine, L-Leucine, L-isoleucine and L-valine, by way of example and not by way of limitation; fatty acids such as docosahexaenonic acid (DHA), eicosapentaeonic acid (EPA), Omega 3's and Omega 6's, by way of example and not by way of limitation; and fiber such as oligofrutopolysaccharides, corn fiber, oat fiber, and flax fiber, by way of example and not by way of limitation.

Concentrated plant extracts, which may be high in vitamins and nutrients, while low in calories, may be added. These extracts may be derived from fruits, herbs, vegetables, and other plants which may have high content of nutritional components. Production of the extracts may be carried out by conventional methods, such as those described in detail in U.S. Pat. No. 6,620,452 B1; however, these extracts may be commercially available. One example of these extracts may be the extract derived from green tea, called Sunphenon 90M, from Taiyo International, Minneapolis, Minn. 55416, USA.

An example of an additive to aid in protection of the muscular system and joints during physical activity may be a hyperimmune milk protein concentrate which works in combination with the edible nutritional protein already present in the protein beverage. The hyperimmune milk protein concentrate may be manufactured in the manner described in detail in U.S. Pat. No. 5,650,175. One example of the hyperimmune milk protein is available from Stolle Milk Biologics of Chicago, Ill. under the trade name MicroLactin™ and distributed by Humanetics Corporation of Eden Prairie, Minn., by way of example and not by way of limitation. The hyperimmune milk protein concentrate may be derived from whey, such as a fractionization from whey. However, the hyperimmune milk protein concentrate may exhibit functional properties similar to casein. Use of a hyperimmune milk protein concentrate in the beverage formulation typically results in a beverage which exhibits turbidity.

The flavoring agent or agents may provide a fruit flavor, cola flavor, vanilla flavor, or a chocolate flavor, by way of example and not by way of limitation. Other flavorings, such as, by way of example, and not by way of limitation, Stevia leaf extract and Lo Han Guo. Sweeteners, natural or synthetic, such as sucrose, sucralose, aspartame, and/or acesulfame potassium, neotame, polydextrose, glycerin, sorbitol, high fructose corn syrup, corn syrup, saccharin, honey, molasses, maple syrup, and xylitol, may be used, by way of example and not by way of limitation. Coloring agents may be added. Agents such as citric acid, fumaric acid, adipic acid, tartaric acid, and in some instances lactic acid may be added to adjust for tartness.

Additional ingredients in the form of analgesics, such, for example, as aspirin may be added in specialized product applications. Mild stimulants other than the foregoing mentioned caffeine, such, for example, as green tea may be added. Relaxants, such, for example, as melatonin may also be added.

To provide stability, the protein drink may include an anti-foaming agent such as dimethylpolysiloxane, and a pH adjusting agent such as phosphoric acid, citric acid, tartaric acid, fumaric acid, adipic acid, and in some instances lactic acid. Excess citric acid and malic acid can cause tartness and astringency of taste and produce an unpalatable beverage that has an unacceptable mouth-feel when consumed. Phosphoric acid is presently preferred as a pH adjusting agent, as the quantity required to obtain a desired pH may be typically less, and the taste of the beverage may be less affected by the pH adjustment. The adjusted pH of the protein drink typically ranges from about 2.0 to about 5.5, more typically from about 2.0 to about 3.4. To further provide stability, the protein drink may be formulated to essentially exclude a component which includes caseinate. Caseinate may not be stable at the pH of the protein beverage.

One or more preservatives may be added to the protein beverage, such as, for example, one or more chemical preservatives, one or more natural preservatives, a combination thereof, or others. Examples of chemical preservatives which may be used include, for example, a sorbate or a benzoate. Examples of natural preservatives which may be used include, for example, nisin or natamycin, which may be obtained commercially from a food ingredient supplier, such as Danisco A/S Langebrogade 1 DK-1001 Copenhagen.

The protein drink may be prepared by admixing in water, an anti-foaming agent, an amount of a pH adjusting agent to provide a pH of about 2 to about 5.5, an amount of juice to provide a final juice content in the beverage ranging from about 0% by weight to about 100% by weight juice, and an amount of protein sufficient to provide a final protein content in the beverage ranging from about 0.01% by weight to about 15% by weight protein; heating the admixture to a temperature ranging from about 140° F. to about 188° F. for a time period adequate to inactivate microbes which may be present in the admixture; cooling the admixture to a temperature of about 40° F. or less; and adding carbon dioxide to the admixture in an amount sufficient to obtain a carbonated protein beverage where the amount of carbonation present in the beverage ranges from about 0.1 volumes to about 6 volumes per volume of liquid admixture. In some embodiments of the method, the carbon dioxide is added in the form of sterile carbonated water. In other embodiments, sterile carbon dioxide is bubbled through the liquid admixture until the desired amount of carbon dioxide is present. In either embodiment, the final juice content of the beverage ranges from about 0% by weight to about 100% by weight, the final protein content of the beverage ranges from about 0.01% by weight to about 15% by weight, and the carbonation ranges from about 0.1 volumes to about 6 volumes.

The protein drink may also be prepared in a manner similar to that described above, with the exception that the heating of the admixture may be carried out after addition of the carbonation rather than prior to addition of the carbonation. This requires that provisions be made to maintain the carbonation during the heating and cooling process. We have discovered that it is possible to maintain the carbonation if the carbonated protein beverage may be packaged in individual size containers and the containers of beverage may then be processed for microbe inactivation.

In other embodiments, the protein drink may be prepared in concentrated forms, which may be diluted prior to consumption with a liquid, such as, for example, but not by way of limitation, water, fruit juice, vegetable juice, tea, alcohol, coffee, milk, soy milk, rice milk, almond milk, a combination thereof or others. Certain embodiments include a liquid used for dilution, which may be a carbonated liquid or a still liquid. If a still liquid is used, the beverage may be carbonated with carbon dioxide gas after dilution. Protein beverage concentrates may be prepared, such as, for example, a protein beverage concentrated syrup or as a protein beverage concentrated powder.

An embodiment of a protein beverage concentrated syrup may include about 0% by weight to about 60% by weight of juice concentrate, wherein said juice concentrate has a Brix value of about 20° Brix to about 75° Brix, and about 0.05% by weight to about 60% by weight protein. Another embodiment of a protein beverage concentrated syrup may include about 0% by weight to about 60% by weight of juice concentrate, wherein said juice concentrate has a Brix value of about 20° Brix to about 75° Brix, and about 10% by weight to about 75% by weight protein. Such protein beverage concentrated syrup may, at the time of packaging and during subsequent storage without refrigeration, maintain substantial solubility of the protein. Such embodiment of the protein beverage concentrated syrup may also, at the time of packaging and during subsequent storage, be essentially free of pathogenic microbes known to be harmful to human health.

Another embodiment of the protein beverage concentrated syrup may include about 10% by weight to about 15% by weight of juice concentrate, wherein said juice concentrate has a Brix value of about 60° Brix to about 70° Brix, and about 5% by weight to about 40% by weight protein.

A further embodiment of the protein beverage concentrated syrup may include about 40% by weight to about 60% by weight of juice concentrate, wherein said juice concentrate has a Brix value of about 40° Brix to about 50° Brix, and about 5% by weight to about 40% by weight protein.

The protein beverage concentrated syrup may include about 0% by weight of juice concentrate and about 0.05% by weight to about 40% by weight protein.

The juice concentrate used for the protein beverage concentrated syrup may be derived from a single fruit juice, a single vegetable juice, fruit juice blends, vegetable juice blends, or fruit and vegetable juice blends may be used. Examples of a few of the many specific juices which may be used may include, but are not limited to, juice from alfalfa sprouts, apples, apricots, avocados, bamboo shoots, bananas, beans, bean sprouts, beets, berries of all types, cabbage, carrots, celery, cherries, cucumbers, currants, dates, figs, grapefruits, grapes, guava, kiwi, kumquat, lemons, limes, lychee fruit, mandarin, mango, melons of all types, nectarines, noni, oranges, papaya, passion fruit, peaches, pears, pineapples, plums, pomegranates, prunes, radishes, rhubarbs, rutabagas, seaweed, squash, tangelo, tangerines, tomatoes, and/or turnips, as well as combinations thereof; however, any type of juice may be used.

The protein used for the protein beverage concentrated syrup embodiment may be essentially free from caseinate. In some embodiments, the essentially caseinate free protein may have some caseinate or may be a whey protein, of the kind previously described herein. An essentially caseinate free protein may be a whey protein which may be derived from whey protein isolate or whey protein concentrate, although other whey protein preparations may also be used, such as, for example, but not by way of limitation, a whey protein extract or a whey protein hydrolysate. The whey protein isolate may be a dry whey protein isolate, with a whey protein concentration of about 90% by weight or more of protein, or an aqueous whey protein isolate, with a whey protein concentration of about 1% by weight to about 40% by weight. The whey protein concentrate may be a dry whey protein concentrate with a concentration of about 25% by weight to about 89.9% by weight protein; however, an aqueous form may also be suitable for certain applications.

The protein used for the protein beverage concentrated syrup may also include any edible protein, other than whey protein, such as, for example, but not by way of limitation, casein, lactalbumin, serum albumin, glycomacropeptide, soy protein, rice protein, pea protein, canola protein, wheat protein, hemp protein, zein, flax protein, egg white protein, ovalbumin, gelatin protein, any combination thereof, or others.

The protein used for the protein beverage concentrated syrup may also include a combination of a whey protein, of the kind previously described herein, and an edible protein, other than whey protein, such as for example, but not by way of limitation, casein, lactalbumin, serum albumin, glycomacropeptide, soy protein, rice protein, pea protein, canola protein, wheat protein, hemp protein, Zein, flax protein, egg white protein, ovalbumin, gelatin protein, any combination thereof, or others.

If a dry protein is used, such as, for example, a dry whey protein (isolate or concentrate) or a dry soy protein, the dry protein may also be hydrated with water to prepare an aqueous protein solution. Typically the pH of the aqueous protein (isolate, concentrate, or hydrated) may be adjusted with an appropriate pH adjusting agent to match the pH of the beverage composition prior to mixing the protein with the beverage composition.

The protein beverage concentrated syrup may further include about 0% by weight to about 100% by weight filler, wherein the filler may be water, a sweetener, a flavoring agent, a coloring agent, an anti-foaming agent, a nutrient, calcium or a calcium derivative, an energy-generating additive, an herbal supplement, a concentrated plant extract, a preservative, combinations thereof, or others.

The protein beverage concentrated syrup may be treated to inactivate microbes by pasteurization, aseptic packaging, carbonation, ozonation, radiation, ultraviolet light, high pressure processing, membrane permeation, pulsed electric field, sonication, combinations thereof, or other microbial inactivation treatments.

The protein beverage concentrated syrup may range from about a two-fold syrup to about a twenty-five-fold syrup. A further embodiment of the protein beverage concentrated syrup may be prepared as about a five-fold syrup, wherein one part protein beverage concentrated syrup may be diluted with four parts liquid to prepare a protein beverage. The liquid may be any suitable liquid for human consumption, such as, for example, but not by way of limitation, water, fruit juice, vegetable juice, tea, alcohol, coffee, milk, soy milk, rice milk, almond milk, combinations thereof, or others.

In some embodiments the protein beverage made from the protein beverage concentrated syrup may be a carbonated beverage. The carbonation of the protein beverage may range from about 1.0 volumes to about 3.5 volumes per volume of beverage, preferably, about 1.6 to about 3.5 volumes per volumes of beverage; more preferably, about 1.6 to about 3.0 volumes per volume of beverage.

The carbonation may be added in the form of carbonated liquid, such as, for example, but not by way of limitation, carbonated water. The carbonation may be added by bubbling sterile carbon dioxide through the protein beverage until the desired amount of carbon dioxide is present. The carbonation may also be added by the addition of any edible carbonation source, such as, for example, but not by way of limitation, a carbonate material capable of reacting with an acid or mixture of acids to effect the release of carbon dioxide upon contact with water, See U.S. Patent Application Publication No. 20020136816, the disclosure of which is incorporated herein by reference.

In some embodiments the protein beverage concentrated syrup may be used by an individual, and may be packaged in single use servings or in small bottles, such as, for example, but not by way of limitation 50 ml-1500 ml bottles suitable for household use. In other embodiments the protein beverage concentrated syrup may be packaged in larger containers suitable for use in a food services beverage dispenser or in a restaurant or bar beverage dispenser. In yet other embodiments the protein beverage concentrated syrup may be produced in large batches for use in the preparation of a protein beverage at a bottling plant or other commercial beverage preparation facility.

The protein beverage concentrated syrup may be prepared by admixing a juice concentrate having a Brix value of about 20° Brix to about 75° Brix, to achieve a percent by weight of juice concentrate of about 0% by weight to about 60% by weight and a protein to achieve a percent by weight of protein in the admixture of about 0.05% by weight to about 60% by weight, thereby obtaining an admixture. The protein beverage concentrated syrup may be packaged in a container which may be stored at room temperature.

In another embodiment the protein beverage concentrate may be a protein beverage concentrated powder, which may include about 0% by weight to about 100% by weight of juice in the form of a dry juice powder and about 0.05% by weight to about 100% by weight protein.

In one embodiment, the weight percent of protein present in the protein beverage concentrated powder may range from about 45% by weight to about 95% by weight.

In another embodiment, the weight percent of juice present in the protein beverage concentrated powder may range from about 0% by weight to about 50% by weight.

The dry juice powder used for the protein beverage concentrated powder may be derived from a single fruit juice, a single vegetable juice, fruit juice blends, vegetable juice blends, or fruit and vegetable juice blends may be used. Examples of a few of the many specific juices which may be used may include, but are not limited to, juice from alfalfa sprouts, apples, apricots, avocados, bamboo shoots, bananas, beans, bean sprouts, beets, berries of all types, cabbage, carrots, celery, cherries, cucumbers, currants, dates, figs, grapefruits, grapes, guava, kiwi, kumquat, lemons, limes, lychee fruit, mandarin, mango, melons of all types, nectarines, noni, oranges, papaya, passion fruit, peaches, pears, pineapples, plums, pomegranates, prunes, radishes, rhubarbs, rutabagas, seaweed, squash, tangelo, tangerines, tomatoes, and/or turnips, as well as combinations thereof; however, any type of juice may be used.

The protein used for the protein beverage concentrated powder embodiment may be essentially free from caseinate. The essentially caseinate free protein may be a whey protein, of the kind previously described herein. An essentially caseinate free protein may be a whey protein which may be derived from whey protein isolate or whey protein concentrate, although other whey protein preparations may also be used, such as, for example, but not by way of limitation, a whey protein extract or a whey protein hydrolysate. The whey protein isolate may be a dry whey protein isolate, with a whey protein concentration of about 90% by weight or more of protein. The whey protein concentrate may be a dry whey protein concentrate with a concentration of about 25% by weight to about 89.9% by weight protein.

The protein used for the protein beverage concentrated powder may also include any edible protein, other than whey protein, such as, for example, but not by way of limitation, casein, lactalbumin, serum albumin, glycomacropeptide, soy protein, rice protein, pea protein, canola protein, wheat protein, hemp protein, zein, flax protein, egg white protein, ovalbumin, gelatin protein, any combination thereof, or others.

The protein used for the protein beverage concentrated powder may also include a combination of a whey protein, of the kind previously described herein, and an edible protein, other than whey protein, such as for example, but not by way of limitation, casein, lactalbumin, serum albumin, glycomacropeptide, soy protein, rice protein, pea protein, canola protein, wheat protein, hemp protein, zein, flax protein, egg white protein, ovalbumin, gelatin protein, any combination thereof, or others.

The protein beverage concentrated powder may further include about 0% by weight to about 100% by weight filler, wherein the filler may be a sweetener, a flavoring agent, a coloring agent, an anti-foaming agent, a nutrient, calcium or a calcium derivative, an energy-generating additive, an herbal supplement, a concentrated plant extract, a preservative, combinations thereof, or others.

The protein beverage concentrated powder may be diluted with liquid to prepare a protein beverage. The liquid may be any suitable liquid for human consumption, such as, for example, but not by way of limitation, water, fruit juice, vegetable juice, tea, alcohol, coffee, milk, soy milk, rice milk, almond milk, combinations thereof, or others.

In some embodiments the protein beverage made from the protein beverage concentrated powder may be a carbonated beverage. The carbonation of the protein beverage may range from about 1.6 volumes to about 3.5 volumes per volume of beverage.

The carbonation may be added in the form of carbonated liquid, such as, for example, but not by way of limitation, carbonated water. The carbonation may be added by bubbling sterile carbon dioxide through the protein beverage until the desired amount of carbon dioxide is present. The carbonation may also be added by the addition of any edible carbonation source, such as, for example, but not by way of limitation, a carbonate material capable of reacting with an acid or mixture of acids to effect the release of carbon dioxide upon contact with water. See U.S. Patent Application Publication No. 20020136816, the disclosure of which is incorporated herein by reference.

In one embodiment the protein beverage concentrated powder may be used by an individual, and may be packaged in single use servings or in small containers, such as, for example, but not by way of limitation 500 gram-1000 gram containers suitable for household use. In another embodiment the protein beverage concentrated powder may be packaged in larger containers suitable for use in a food services beverage dispenser or in a restaurant or bar dispenser. In yet another embodiment the protein beverage concentrated powder may be produced in large batches for use in the preparation of protein beverage at a bottling plant.

The protein beverage concentrated powder may be prepared as dry preparations, such as, for example, but not by way of limitation, a powder, granular, crystal, or other type of dry particle preparations. The dry preparations may be prepared by mixing the various ingredients in their powder forms. Alternatively, the dry preparations may be prepared by mixing the various ingredients as described above to form a concentrated syrup, then drying the syrup to a dry powder form by conventional drying methods, such as, for example, but not by way of limitation, lyophilization (freeze drying), spray drying, fluid bed drying, drum drying, combinations thereof, or others.

In some embodiments the protein beverage concentrated powder may be prepared by admixing a dried juice powder concentrate to achieve a percent by weight of juice concentrate of about 0% by weight to about 100% by weight and a protein to achieve a percent by weight of protein in the admixture of about 0.05% by weight to about 100% by weight.

In many of the Examples described below, the protein used is whey protein, since this protein provides the taste and offers other nutritional advantages of the kind previously discussed. However, one skilled in the art will understand that by adjusting the pH to extend to higher or lower pH ranges and/or producing a carbonated protein drink having a protein content at other positions in the range of about 2% to about 15%, other proteins such as milk protein, soy protein, lactalbumin, serum albumin, glycomacropeptide, rice protein, pea protein, canola protein, wheat protein, hemp protein, zein, flax protein, egg white protein, ovalbumin, gelatin, combinations thereof, or others, by way of example and not by way of limitation, may also be used, alone or in combination, to create the present protein beverage. Hydrolysates and derivatives of these common protein sources may also be used in embodiments contemplated by this disclosure.

In most of the Examples described below, the method used to inactivate microbes is pasteurization, however other methods may be used, such as aseptic packaging, carbonation, ozonation, radiation, ultra violet light, high pressure processing, membrane permeation, pulsed electric field, sonication, combinations thereof, or others.

EXAMPLES

Example One

A protein drink was prepared in the following general manner. An anti-foaming agent was added to an amount of water that is about one half of the final volume of beverage to be made; typically other additives, of the kind which are described above, are also added to the water at this time. The pH of the water with anti-foaming agent (and other additives, depending on the final product desired) was adjusted to be in the range of about 2 to 3.4, typically using phosphoric acid. Whey protein was then added to the water/additives admixture. The admixture was heated to about 185° F. for about 20 seconds to inactivate microbes and then was cooled to about 40° F. Carbonated water which comprised from 0.2 to 8 volumes of carbon dioxide gas (per volume of water) was added to the cooled admixture in an amount so that the amount of carbon dioxide gas in the beverage totaled an amount which ranged from about 0.1 volume to about 4 volumes per volume of water.

If necessary, the final pH of the admixture may be adjusted to a pH ranging between 2 and 3.4 by addition of an appropriate acid, such as phosphoric acid.

Example Two

A protein drink was prepared in the following manner. An admixture of water, anti-foaming agent, other additives, and whey protein was prepared, and the pH was adjusted to be within a range between about 2 and 3.4. The volume of the admixture was such that when combined with the desired amount of carbon dioxide, the final volume of the carbonated admixture would be (as nearly as possible) that which is required to provide the desired composition of the carbonated protein beverage. The admixture was heated to inactivate microbes, using a technique known in the art. Carbon dioxide gas was then bubbled through the admixture to obtain a carbonation content ranging from 0.1 to 4 volumes of carbon dioxide gas. A small amount of additional water was added to reach the desired final concentration of water in the carbonated protein beverage, and the pH was readjusted using phosphoric acid, or another bio-compatible acid of the kind previously disclosed, to be in the range of about 2 to 3.4.

The whey protein used to make the better tasting beverage of the invention can be in the form of whey protein concentrate, where the whey protein generally makes up about 25 weight % to about 89.9 weight % of the whey protein concentrate. The whey protein used may be whey protein isolate, which contains at least 90% by weight whey protein. However, the final concentration of whey protein in a carbonated beverage of the invention ranges from about 0.01% by weight to about 15% by weight of the final carbonated protein beverage composition.

When sweetening agent is employed, a particular flavor such as fruit flavor, chocolate, vanilla, combinations thereof, or others, may be added, this may typically be done prior to the carbonation step, as is the case with the nutrients and/or herbal supplements, for example.

With respect to Examples One and Two, additional ingredients may be added to produce specialized products, such as analgesics (e.g. aspirin), mild stimulants (e.g. caffeine), or relaxants. These ingredients may be typically added to the admixture prior to both the heat treatment and carbonization steps, independent of the order in which these two steps are carried out.

After all of the ingredients are in the admixture, including the carbonation, the carbonated protein drink composition may be typically aseptically dispensed into a large, bulk container or into individual containers such as a glass bottle, a plastic bottle, a tetra pak, or a can.

Example Three

This example provides a method for preparing 3,937 grains of a whey protein beverage. Into 1799 grams of water, the following were admixed: 315 grains of whey protein isolate (approximately 90% whey protein); 0.01 grain Designer Whey® whey protein, available from Next Proteins Inc.; 30 grains of Taurine, available from Premium Ingredients, Franklin Park, Ill.; 0.37 grams of acesulfame-K sweetener; 0.46 grams of powdered sucralose sweetener; 7.9 grams of citric acid; 2.95 grams of malic acid; 0.25 grams of FG-10™ antifoam, available from Dow Chemical Co.; 27 grams of phosphoric acid (75% by weight in water); 2.95 grains of Sunkist® Spray Dried Orange Oil #61281165 flavoring; 3.4 grams of Firmenich Passion Fruit 860.344/TD 11.90 flavoring, available from Premium Ingredients, Franklin Park, Ill.; and 0.04 grains of FD &C Yellow #6 coloring, available from Seltzer Chemicals, Carlsbad, Calif., were added to a stainless steel 200 gallon mixing tank which employed a propeller prop mixer, which was typically operated at about 400 RPM to about 600 RPM for a time period of about 15 minutes. The order of addition of ingredients to the mixing tank was: water, acids, colors, flavorings, sweeteners, protein, pH adjusting acids, and antifoam. Typically the maximum temperature achieved during the mixing of ingredients was less than about 150° F.

The admixture described above was heated to about 185° F. for a time period of 20 seconds, and then was cooled to about 40° F. The admixture was not agitated during heating or cooling, but was passed through lines wrapped with heating or cooling coils. 1700 grains of soda water (water containing 3 volumes of carbon dioxide per volume of water), 27 grams of phosphoric acid (75% by weight acid in water), and 0.24 grams of the FG 10 anti-foam emulsion were added in that order to the admixture to obtain a final carbonated whey protein beverage which contained approximately 7% by weight whey protein, at a final pH of 2.7.

Example Four

This example is for preparation of a 60 gallon batch of protein drink. The mixing vessel and agitation was the same as that described with respect to Example Three. The mixing vessel and associated fluid flow lines were sanitized. All filters on the processing system were cleaned or replaced.

27 gallons of water was added to the mixing tank. The water was purified water, treated using reverse osmosis in a manner commonly used in the beverage industry.

0.054 pounds of acesulfame potassium was added to the agitating water in the mixing vessel over a 15 second time period.

0.08 pounds of sucralose powder was added to the agitating water in the mixing vessel over a 15 second time period.

0.005 pounds of Yellow #6 and 0.003 pounds of Red #40 were added to the agitating water in the mixing vessel over a 30 second time period.

The mixture in the mixing vessel was agitated at 400 RPM for a time period of one minute.

0.34 pounds of malic acid; 1.06 pounds of citric acid; 4.6 pounds of phosphoric acid; 0.26 pounds of Red Punch 586323 CE, available from Premium Ingredients, Franklin Park, Ill.; 0.46 pounds of Tropical Fruit 597540 C, available from Premium Ingredients, Franklin Park, Ill.; 0.46 pounds of Raspberry Flavor 01-EF956, available from Western Flavors and Fragrances, Livermore, Calif.; 3.96 pounds of Taurine, and 0.001 pounds of Designer Whey Natural™ were added over a 60 second time period. The combined admixture was then mixed for 2 minutes.

Subsequently, 0.06 pounds of FG-10 Anti foam, and 37.6 pounds of Whey Protein Isolate were then added over a 60 second time period, and the admixture was then agitated for a time period sufficient to obtain a homogeneous mixture (typically about 15 minutes at 400 RPM).

The pH of the admixture was then measured, and incremental amounts of about 3.5 pounds of Phosphoric Acid (75% by weight in water) were then added, with a one minute mix time between additions, until a pH of about 2.5 was obtained.

Brix, color, and turbidity were then measured or described and documented.

For the above formulation, one half of the volume of the finished product may be carbonated water. The carbonated water was added to the mixing tank in a volumetric amount based on the volume of liquid present from previous preparation in the mixing tank. (The carbonated water contained 3 volumes of carbon dioxide per volume of water.) It was found that there is little or no need to extensively agitate the combined volumes of ingredients, since the carbonation is substantially self-distributing. Further, rapid agitation would result in foaming of the batch of ingredients.

After addition of the carbonated water, the carbonated protein drink was treated to inactivate microbes and then packaged. Preferably, the treated carbonated protein drink product mixture is continuously agitated at a low agitation speed up to the time of packaging. In the event the product mixture is held longer than 30 minutes prior to microbe inactivation and packaging, the product mixture may be re-circulated to assure adequate mixing and the turbidity, pH, color and Brix may be performed and documented a second time to assure that product quality is satisfactory, prior to microbe inactivation and packaging.

The heat treatment temperature typically used for microbe inactivation may be 188° F. or less. More typically, the maximum heat treatment temperature may be about 150° F. In the present instance, the heat treatment was at 150° F., for a time period of 30 minutes.

After microbe inactivation, the carbonated protein drink product mixture was bottled into 500 ml PET bottles available from Novapak, Eatontown, N.J. The bottles were capped with Owens™ 28 mm closures, available from Owens, Inc., Toledo, Ohio. The caps were torqued to the specification provided by the manufacturer. The filled bottles were tested for leakage to ensure integrity of the package.

Example Five

A protein beverage was prepared in the manner described in Example Two, with the exception that there was no heat treatment or cooling prior to the addition of carbonation. Subsequent to the carbonation step, (and final adjustment of the pH of the admixture to range between about 2 and about 3.4), the admixture was packaged. Packaging was in a beer/beverage can of the kind which is frequently used in the art, where the can employed an epoxy resin on the interior surface of the can. The epoxy resin coating was bisphenol A diglycidyl ether (BADGE). The end cap applied to the can was a 240 Stolle Loe cap, which was applied in a manner typically used in the beverage canning industry. The machinery used to accomplish the canning, and the 240 Stolle Loe cap are available from Stolle Machinery Company, LLC End and Metal Forming Division, Sidney Ohio. The protein beverage was charged into the beverage can at a temperature of less than 60° F., and the can was simultaneously evacuated of air and sealed by the apparatus.

The sealed can was heated using tunnel "pasteurization" to a maximum temperature of 150° F. and was held at this temperature for a time period of 20 to 25 minutes. The can was then cooled to room temperature over a time period of about 5 minutes.

Cans of the canned protein beverage were sampled and tested for microbes. The product specification limits for such testing were as follows. TABLE-US-00001 Specification Specification Limit Total aerobic plate count NMT 10,000 cfu/g Yeast and Mold NMT 500 cfu/g Coliforms NMT 10 cfu/g *Escherichia Coli* Negative in 25 g *Staphylococcus Aureus* NMT 10 cfu/g *Salmonella* Negative in 100 g.

The test plate showed a complete absence of any of the microbes on the above listing, immediately after packaging and for a time period of 52 weeks thereafter, with testing continuing at this time.

The above described exemplary embodiments are not intended to limit the scope of the present invention, as one skilled in the art can, in view of the present disclosure expand such embodiments to correspond with the subject matter of the invention claimed below.

Example Six

Carbonated protein-fortified juice beverage may be prepared from a complete syrup premix in a manner similar to that used in modern soft drink production.

A ready to drink beverage may be prepared as described in the following two general steps. The first step may be the preparation of a syrup with or without bulk pasteurization; the second step may be the batch dilution or continuous dilution of the syrup to finished-product percent water ("single-strength") and in-line, continuous carbonation and container filling. Aqueous whey protein (isolate or concentrate) with a protein concentration of 1-40% actual protein, typically 8-20% protein may be used.

A 1000 gallon batch of carbonated or uncarbonated whey protein-fortified 15% orange juice beverage containing approximately 3.3% protein may be produced by preparing 200 gallons of a five-fold syrup weighing about 840 kg in the following general manner.

685 kg of aqueous whey protein (isolate or concentrate) at 40-55° F. with a protein concentration of 18.8% protein may be mixed with approximately 16 kg of Phosphoric Acid, usually 75-85%, to adjust the pH of the aqueous whey protein to 3.0-3.5, typically about pH 3.3.

110 kg of 65 degree Brix orange juice concentrate may be blended with the protein solution using a high-power, low-speed mixer designed for viscous fluids.

The following ingredients may be added with continuous mixing until a homogeneous mixture is achieved: 4.5 kg of 25% (w/w) sucralose solution, 1.5 kg sodium benzoate preservative which is pre-dissolved in 4 gallons of 80-100° F. water, and 5 kg of natural orange flavor 73237R (Blue Pacific Flavors, City of Industry, Calif.).

Syrup may be de-aerated and stored.

With batch or continuous in-line dilution of the syrup with 4 parts purified water, optionally followed by pasteurization & carbonation with 1-3 volumes of carbon dioxide, the beverage may be filled into plastic, steel, or aluminum containers, after which container closures may be immediately applied.

Example Seven

A flavored, concentrated juice syrup containing whey protein may be prepared for packaging and consumption in personal or foodservice/restaurant applications where the final beverage may or may not contain carbonation. Preparation of the syrup may be done as follows.

Aqueous whey protein (isolate or concentrate) with a protein concentration of 1-40% actual protein, typically 8-20% protein may be used. 200 gallons of a five-fold syrup weighing about 840 kg may be prepared in the following general manner. 685 kg of aqueous whey protein (isolate or concentrate) at 40-55° F. with a protein concentration of 18.8% protein may be mixed with approximately 16 kg of Phosphoric Acid, usually 75-85%, to adjust the pH of the aqueous whey protein to 3.0-3.5, typically about pH 3.3.

110 kg of 65 degree Brix orange juice concentrate may be blended with the protein solution using a high-power, low-speed mixer designed for viscous fluids.

The following ingredients may be added with continuous mixing until a homogeneous mixture is achieved: 4.5 kg of 25% (w/w) sucralose solution, 1.5 kg sodium benzoate preservative which is pre-dissolved in 4 gallons of 80-100° F. water, and 5 kg of natural orange flavor 73237R (Blue Pacific Flavors, City of Industry, Calif.).

Syrup may be packaged into molded ampoules or form-fill-seal packets for personal use in single-serving amounts.

Syrup may be filled into bag-in-box (Scholle) containers for use in foodservice or restaurant drink dispensers which automatically meter dilution water and which may or may not also add carbonation.

Syrup may be filled into bottles, typically one pint to one gallon size, for use as cocktail beverage mixers in foodservice or personal applications.

Example Eight

A complete concentrated dry mixture of water-soluble powders including whey protein and real whole fruit juice solids intended for reconstituting with liquid, usually water, into an acidic beverage or beverage ingredient may be prepared in bulk for subsequent ready to drink beverage manufacturing. The final beverage may be pasteurized before or after filling as previously described, and may contain additional ingredients and carbonation. Preparation of the powder mixture may be done using any suitable powder blending equipment, including ribbon blender, V-blender, or tote blending.

The batch volume may be within the specified range of the equipment capacity. Blending time, usually 15-30 minutes, may be set by sampling and analysis to verify the minimum time necessary for uniform distribution of all ingredients. Parameters may include ingredient particle sizes, formula percentages, and type and speed of mixing equipment.

This example describes the dry mixture which may be added to water to prepare a 20% juice beverage with 3.3% whey protein. Ingredients may be added to the blender in the following percentages, expressed as weight percent of batch. Ingredients representing less than two percent of the total may be pre-blended manually with a small amount of the protein in a plastic bag or mechanically in smaller device before addition to reduce the time needed for a uniform final blend. Pre-acidified whey protein isolate (Inpro 90 HS, Vitalus), 57.3%; freeze-dried raspberry juice concentrate (Mastertaste C12570, Plant City, Fla.), 41.5%; natural berry flavor (Mixed Berry BV84, Virginia Dare Flavors, Brooklyn, N.Y.), 0.85%; sucralose powder, 0.3%; and powdered anti-foam (Dow Corning 1920), 0.05% may be added.

Other soluble powders such as carbohydrates and fibers may be added or substituted.

The powder blend may be packaged in a plastic liner in a drum such as a typical 55-gallon size or a rigid or fabric tote capable of holding approximately 1500 pounds of the powder.

Subsequent use for preparation of fluid beverages may be conducted as follows. If a common preservative such as a benzoate or sorbate is to be included, it is best to dissolve it in the batch water prior to addition of the protein beverage blend. Water at 50-100° F., usually purified by reverse osmosis, may be added to a variable-speed, bottom-agitator mixing tank in a ratio of 15 pounds of water per pound of powder blend. Preservative may be added and dissolved if specified. With continuous agitation and the fastest speed which will not cause excessive foaming of added powder blend, the beverage blend may be added to the water and mixed until thoroughly dissolved, usually 15-20 minutes. Final pH check may be performed, and further acidification may be done using phosphoric, malic, tartaric, or citric acid.

This final bulk liquid beverage may be suitable for filling into plastic or metal containers as described in previous examples, and may be chilled and carbonated using previously described methods prior to filling.

Example Nine

A complete concentrated dry mixture of water-soluble powders including whey protein and real whole fruit juice solids intended for reconstituting with liquid, usually water, into an protein-fortified juice beverage or beverage ingredient may be prepared for packaging suitable for retail, foodservice, or restaurant applications. The final beverage may contain additional ingredients and carbonation. Preparation of the powder mixture may be done using any suitable powder blending equipment, including ribbon blender, V-blender, or tote blending.

The batch volume may be within the specified range of the equipment capacity. Blending time, usually 15-30 minutes, may be set by sampling and analysis to verify the minimum time necessary for uniform distribution of all ingredients. Parameters may include ingredient particle sizes, formula percentages, and type and speed of mixing equipment.

This example describes the dry mixture which may be added to water to prepare a 20% juice beverage with 3.3% whey protein when 32 grains are added to 16 ounces of water. Ingredients may be added to the blender in the following percentages, expressed as weight percent of batch. Ingredients representing less than two percent of the total may be pre-blended manually with a small amount of the protein in a plastic bag or mechanically in smaller device before addition to reduce the time needed for a uniform final blend. Pre-acidified whey protein isolate (Inpro 90 HS, Vitalus), 57.3%; freeze-dried raspberry juice concentrate (Mastertaste C12570, Plant City, Fla.), 41.5%; natural berry flavor (Mixed Berry BV84, Virginia Dare Flavors, Brooklyn, N.Y.), 0.85%; sucralose powder, 0.3%; and powdered anti-foam (Dow Corning 1920), 0.05% may be added.

Other soluble powders such as carbohydrates and fibers may be added or substituted.

The powder blend may be packaged for retail distribution in single serving packets or multiple-serving canisters containing a plastic scoop of a volume appropriate to the recommended usage. For example, the consumer may add a serving of 32 grams to 16 ounces of water to produce a beverage with a pH about 3.3 which provides a 20% juice beverage with 3.3% whey protein and other ingredients at levels suitable for that range of water volume.

The powder blend may also be packaged for use in bar, restaurant, or other foodservice uses and reconstituted as needed. Juices and/or alcohol products and/or carbonated water may be added or substituted for some or all of the water.

Example Ten

Carbonated whey protein beverage may be prepared from a complete syrup premix in a manner similar to that used in modern soft drink production.

A ready to drink beverage may be prepared as described in the following two general steps. Aqueous whey protein (isolate or concentrate) with a protein concentration of 5-40% actual protein, typically 8-20% protein may be used. The first step may be the preparation of the syrup with or without bulk pasteurization; the second step may be the batch dilution or continuous dilution of the syrup to finished-product percent water ("single-strength") and in-line, continuous carbonation and container filling.

A 1000 gallon batch of carbonated cola-flavored whey protein beverage containing approximately 3.7% protein may be prepared from 200 gallons of a five-fold syrup in the following general manner. 760 kg of aqueous whey protein (isolate or concentrate) with a protein concentration of 18.8% protein may be mixed with approximately 20 kg of Phosphoric Acid, usually 75-85%, to adjust the pH of the aqueous whey protein to 3.0-3.5, typically about pH 3.2. Other acids such as tartaric or citric acid may be added primarily for flavor purposes.

The following ingredients may be added with continuous mixing: 5.95 kg of 25% (w/w) sucralose solution, 5.35 kg of Caramel Color 201 from (D.D. Williamson, Louisville, Ky.) 500 g caffeine, 5 kg sodium benzoate preservative, and 1.8 kg Cola flavor 78388R (Blue Pacific Flavors, City of Industry, Calif.).

Other acid soluble, acid-stable ingredients such fibers, vitamins or other nutrients may also be added.

With continuous in-line dilution and carbon dioxide injection, the syrup may be diluted with 4 parts purified, chilled water and 1-3 volumes of carbon dioxide prior to being filled into plastic, steel, or aluminum containers, after which container closures may be immediately applied.

Example Eleven

A flavored, concentrated syrup containing whey protein may be prepared for packaging and consumption in personal or foodservice/restaurant applications where the final beverage may or may not contain carbonation. Preparation of the syrup may be done as follows.

Aqueous whey protein (isolate or concentrate) with a protein concentration of 1-40% actual protein, typically 8-20% protein may be used. A 200 gallon batch of orange-flavored whey protein five-fold syrup may be prepared in the following manner. 760 kg of aqueous whey protein (isolate or concentrate) at 40-55° F. with a protein concentration of 18.8% protein may be mixed with approximately 17 kg of Phosphoric Acid, usually 75-85%, to adjust the pH of the aqueous whey protein to 3.0-3.5, typically about pH 3.3. Other acids such as tartaric or citric acid may be added primarily for flavor purposes.

The following ingredients may be added with continuous mixing: 6 kg of 25% (w/w) sucralose solution, 4 kg of Orange Color, 5 kg citric acid, 500 g caffeine, 5 kg sodium benzoate preservative which may be pre-dissolved in 3 gallons of 80-100° F. water, and 7 kg of Orange flavor 73237R (Blue Pacific Flavors, City of Industry, Calif.).

Syrup may be packaged into molded ampoules or form-fill-seal packets for personal use in single-serving amounts.

Syrup may be filled into bag-in-box (Scholle) containers for use in foodservice or restaurant drink dispensers which automatically meter dilution water and which may or may not also add carbonation.

Syrup may be filled into bottles, typically one pint to one gallon size, for use as cocktail beverage mixers in foodservice or personal applications.

Example Twelve

A complete concentrated dry mixture of water-soluble powders including whey protein intended for reconstituting with liquid, usually water, into an acidic beverage or beverage ingredient may be prepared in bulk for subsequent ready to drink beverage manufacturing. The final beverage may contain additional ingredients and carbonation. Preparation of the powder mixture may be done using any suitable powder blending equipment, including ribbon blender, V-blender, or tote blender.

The batch volume may be within the specified range of the equipment capacity. Blending time, usually 15-30 minutes, is set by sampling and analysis to verify the minimum time necessary for uniform distribution of all ingredients. Parameters include ingredient particle sizes, formula percentages, and type and speed of mixing equipment.

Ingredients may be added to the blender in the following percentages, expressed as weight percent of batch. Ingredients representing less than two percent of the total may be pre-blended manually with a small amount of the protein, or if used, sugars, in a plastic bag or mechanically in smaller device before addition to reduce the time needed for a uniform final blend. Pre-acidified whey protein isolate (Inpro 90 HS, Vitalus), 95%; natural berry flavor (Mixed Berry BV84, Virginia Dare Flavors, Brooklyn, N.Y.), 2.5%; sucralose powder, 1.1%; malic acid, 1%; vitamin & mineral premix, 0.28%; powdered anti-foam (Dow Corning 1920), 0.1%; FD&C Blue #1 (Sensient 5601, St. Louis, Mo.), 0.01%; and FD&C Red #40 (Sensient 4400), 0.01% may be added.

Other soluble powders such as carbohydrates and fibers may be added or substituted.

The powder blend may be packaged in a plastic liner in a drum such as a typical 55-gallon size or a rigid or fabric tote capable of holding approximately 1500 pounds of the powder.

Subsequent use for preparation of fluid beverages may be conducted as follows. If a common preservative such as a benzoate or sorbate is to be included, it is best to dissolve it in the batch water prior to addition of the protein beverage blend. The blend formula of this example may be suitable for preparation of a beverage with a water:powder weight ratio range of about 10:1 to 20:1.

Water at 50-100° F., usually purified by reverse osmosis, may be added to a variable-speed, bottom-agitator mixing tank in an amount required for selected dilution ratio. Preservative may be added and dissolved if specified. With continuous agitation and the fastest speed which will not cause excessive foaming of added powder blend, the beverage blend may be added to the water and mixed until thoroughly dissolved, usually 15-20 minutes. Final pH check may be performed, and further acidification may be done using phosphoric, malic, tartaric, or citric acid.

This final bulk liquid beverage may be suitable for filling into plastic or metal containers as described in previous examples, and may be chilled and carbonated using previously described methods prior to filling.

Example Thirteen

A complete concentrated dry mixture of water-soluble powders including whey protein intended for reconstituting with liquid, usually water, into an acidic beverage or beverage ingredient may be prepared for packaging suitable for retail, foodservice, or restaurant applications. The final beverage may contain additional ingredients and carbonation. Preparation of the powder mixture may be done using any suitable powder blending equipment, including ribbon blender, V-blender, or tote blending.

The batch volume may be within the specified range of the equipment capacity. Blending time, usually 15-30 minutes, may be set by sampling and analysis to verify the minimum time necessary for uniform distribution of all ingredients. Parameters may include ingredient particle sizes, formula percentages, and type and speed of mixing equipment.

Ingredients may be added to the blender in the following percentages, expressed as weight percent of batch. Ingredients representing less than two percent of the total may be pre-blended manually with a small amount of the protein, or if used, sugars, in a plastic bag or mechanically in smaller device before addition to reduce the time needed for a uniform final blend. Pre-acidified whey protein isolate (Inpro 90 HS, Vitalus), 95%; natural berry flavor (Mixed Berry BV84, Virginia Dare Flavors, Brooklyn, N.Y.), 2.5%; sucralose powder, 1.1%; malic acid, 1%; vitamin & mineral premix, 0.28%; powdered anti-foam (Dow Corning 1920), 0.1%; FD&C Blue #1 (Sensient 5601, St. Louis, Mo.), 0.01%; and FD&C Red #40 (Sensient 4400), 0.01% may be added.

Other soluble powders such as carbohydrates and fibers may be added or substituted.

The powder blend may be packaged for retail distribution for personal use in single serving packets or multiple-serving canisters containing a plastic scoop of a volume appropriate to the recommended usage. For example, the consumer may add a serving of 14.25 grams to 10-20 ounces of water to produce of beverage with pH about 3.3 which provides about 12 grams of protein and other ingredients at levels suitable for that range of water volume.

The powder blend may also be packaged for use in bar, restaurant, or other foodservice uses and reconstituted as needed. Juices and/or alcohol products and/or carbonated water may be added or substituted for some or all of the water.

Example Fourteen

Protein-fortified acidic beverages also containing fruit juices, caloric sweeteners, or non-caloric sweeteners may be prepared from a formula which is wet-mixed then dried into a homogeneous powder instead of blended as a combination of several individual dry ingredients. Advantages of drying a complete beverage concentrate is that the dry mix is completely homogeneous, and drying by lyophilization (freeze-drying) in particular yields a higher quality than high-heat methods, with less degradation of color, flavor, nutrients, and protein functionality. Automated continuous or semi-continuous syrup manufacturing using mass flow metering in a closed system may be used to produce the syrup instead of a batch method. Optimum syrup solids content for subsequent drying is dependent upon equipment design and viscosity of the syrup.

The dried concentrated beverage powder may be prepared as described in the following two steps, and contains orange juice and egg white protein in a ratio which represents 100% orange juice as well as level of protein equal to milk. The first step may be the preparation of a syrup similar to those described herein; the second step may be the drying of the syrup to about 5% residual moisture.

Liquid egg white, naturally containing about 10.5% protein, may be poured or pumped into a bottom-agitated or swept-surface mixing vessel in an amount equal to 54.1% of total syrup batch weight. With constant mixing at about 200 rpm, an amount of concentrated (85%) phosphoric acid equal to 0.7% of total syrup batch weight may be added, which is the amount needed to adjust the pH of the egg white liquid to about 3.2.

Orange Juice concentrate (42° Brix) may be mixed into the acidified protein solution in an amount equal to 45.2% or total syrup batch weight. This syrup may have a final water content of about 72%

Syrup may be freeze-dried to a powder with a residual moisture level of approximately 5% or less.

Dilution of the powder in a ratio of 40 g powder to 220 ml water may yield an eight fluid ounce serving of single-strength orange also containing 3.3% protein.

Reconstitution may be optionally followed by any of pasteurization & carbonation and container filling as described previously herein.

Example Fifteen

Protein-fortified acidic beverages also containing flavorings, caloric sweeteners, or non-caloric sweeteners may be prepared from a formula which is wet-mixed then dried into a homogeneous powder instead of blended as a combination of several individual dry ingredients. Advantages of drying a complete beverage concentrate is that the dry mix is completely homogeneous, and drying by lyophilization (freeze-drying) in particular yields a higher quality than high-heat methods, with less degradation of color, flavor, nutrients, and protein functionality. Automated continuous or semi-continuous syrup manufacturing using mass flow metering in a closed system may be used to produce the syrup instead of a batch method. Optimum syrup solids content for subsequent drying is dependent upon equipment design and viscosity of the syrup.

The dried concentrated beverage powder may be prepared as described in the following two steps, and contains high fructose corn syrup and whey protein to produce a beverage with a level of protein equal to milk. The first step may be the preparation of a syrup similar to those described herein; the second step may be the drying of the syrup to about 5% residual moisture.

Aqueous whey protein from membrane filtration, containing 18.8% protein, may be poured or pumped into a bottom-agitated or swept-surface mixing vessel in an amount equal to 54.2% of total syrup batch weight. With constant mixing at about 200 rpm, an amount of concentrated (85%) phosphoric acid equal to 1.1% of total syrup batch weight may be added, which may be the amount needed to adjust the pH of the protein solution to about 3.0.

High fructose Corn Syrup (DE=55, ADM, Decatur, Ill.) may be mixed into the acidified protein solution in an amount equal to 43.97% of total syrup batch weight.

The following ingredients may be added in amount stated as a percentage of total syrup batch weight: Caramel Color (#7201, Colormaker, Anaheim, Calif.), 0.44%; natural cola flavor (#78388%, Blue Pacific Flavors, Industry, Calif.), 0.15%; Ascorbic acid (Vitamin C), 0.07%; and Caffeine, 0.07%. This syrup may have a final water content of about 50% and represent a "2+1" (water+syrup) product.

Syrup may be freeze-dried to a powder with a residual moisture level of approximately 5%.

Dilution of the powder in a ratio of 63.5 g powder to 298 ml water may yield a twelve fluid ounce serving of single-strength beverage containing 3.3% protein.

Reconstitution may be followed by any of pasteurization & carbonation and container filling as described previously herein.

While particular embodiments of the present invention have been disclosed, it is to be understood that various different modifications are possible and are contemplated within the true spirit and scope of the appended claims.

We claim:

1. A protein beverage concentrated syrup composition suitable for dilution to generate a beverage suitable for human consumption, comprising:
   about 0% by weight to about 60% by weight juice concentrate, wherein said juice concentrate has a Brix value of about 20° Brix to about 75° Brix;
   about 10% by weight to about 60% by weight protein, wherein said protein is essentially free of lactose and hydrolyzed lactose; and
   wherein said protein beverage concentrated syrup is essentially free of lactose; and
   wherein both, at the time of packaging of the protein beverage concentrated syrup and during subsequent storage without refrigeration, substantial solubility of the protein is maintained in the protein beverage concentrated syrup, and wherein said protein beverage concentrated syrup is essentially free of pathogenic microbes known to be harmful to human health, both at the time of packaging of the protein beverage concentrated syrup and during subsequent storage.

2. A protein beverage concentrated syrup in accordance with claim 1, wherein said protein beverage concentrated syrup ranges from about a two-fold syrup to about a twenty-five-fold syrup.

3. A protein beverage concentrated syrup in accordance with claim 1, wherein said protein beverage concentrated syrup is about a five-fold syrup.

4. A protein beverage concentrated syrup in accordance with claim 3, wherein one part of said protein beverage concentrated syrup is diluted with four parts liquid to prepare a protein beverage suitable for human consumption.

5. A protein beverage concentrated syrup in accordance with claim 4, wherein said liquid is water, fruit juice, vegetable juice, tea, alcohol, coffee, milk, soy milk, rice milk, almond milk, or combinations thereof.

6. A protein beverage concentrated syrup in accordance with claim 4, wherein said liquid contains carbonation.

7. A protein beverage concentrated syrup in accordance with claim 4, wherein said protein beverage contains carbonation.

8. A protein beverage concentrated syrup in accordance with claim 7, wherein said carbonation of said protein beverage ranges from about 1.6 volumes to about 3.5 volumes per volume of protein beverage.

9. A protein beverage concentrated syrup in accordance with claim 1, comprising:
   about 10% by weight to about 15% by weight juice concentrate, wherein said juice concentrate has a Brix value of about 60° Brix to about 70° Brix; and
   about 10% by weight to about 40% by weight protein.

10. A protein beverage concentrated syrup in accordance with claim 1, comprising:
    about 40% by weight to about 60% by weight juice concentrate, wherein said juice concentrate has a Brix value of about 40° Brix to about 50° Brix; and
    about 10% by weight to about 40% by weight protein.

11. A protein beverage concentrated syrup in accordance with claim 1, comprising:
    about 0% by weight juice concentrate; and
    about 10% by weight to about 40% by weight protein.

12. A protein beverage concentrated syrup in accordance with claim 4, wherein said weight percent of protein present in said protein beverage ranges from 2% by weight to about 8% by weight.

13. A protein beverage concentrated syrup in accordance with claim 12, wherein said weight percent of protein present in said protein beverage ranges from 1.6% by weight to about 4% by weight.

14. A protein beverage concentrated syrup in accordance with claim 4, wherein said weight percent of juice present in said protein beverage ranges from 2% by weight to about 20% by weight.

15. A protein beverage concentrated syrup in accordance with claim 14, wherein said weight percent of juice present in said protein beverage ranges from 10% by weight to about 20% by weight.

16. A protein beverage concentrated syrup in accordance with claim 1, wherein said juice is fruit juice or vegetable juice.

17. A protein beverage concentrated syrup in accordance with claim 1, wherein said protein is derived from whey protein, casein, lactalbumin, serum albumin, glycomacropeptide, soy protein, rice protein, pea protein, canola protein, wheat protein, hemp protein, zein, flax protein, egg white protein, ovalbumin, gelatin protein, or combinations thereof.

18. A protein beverage concentrated syrup in accordance with claim 17, wherein said protein is derived from whey protein.

19. A protein beverage concentrated syrup in accordance with claim 18, wherein said whey protein is derived from whey protein isolate, whey protein concentrate, whey protein hydrolysate, or combinations thereof.

20. A protein beverage concentrated syrup in accordance with claim 4, wherein said protein beverage exhibits a pH ranging from about 2.0 to about 3.4.

21. A protein beverage concentrated syrup in accordance with claim 20, wherein said beverage exhibits a pH ranging from about 3.0 to about 3.2.

22. A protein beverage concentrated syrup in accordance with claim 1, wherein said essentially free from active microbe condition is created by the inactivation of microbes by pasteurization, aseptic packaging, carbonation, ozonation, radiation, ultra violet light, high pressure processing, membrane permeation, pulsed electric field, sonication, or combinations thereof.

23. A protein beverage concentrated syrup in accordance with claim 1, further comprising about 0% by weight to about 100% by weight filler.

24. A protein beverage concentrated syrup in accordance with claim 23, wherein said filler comprises at least one additional ingredient selected from the group including water, a sweetener, a flavoring agent, a coloring agent, an anti-foaming agent, a nutrient, calcium or a calcium derivative, an energy-generating additive, an herbal supplement, a concentrated plant extract, and a preservative.

25. A protein beverage concentrated syrup in accordance with claim 24, wherein said energy generating additive is caffeine, citrulline malate, a magnesium-containing compound, or a combination thereof.

26. A protein beverage concentrated syrup in accordance with claim 24, wherein said preservative is a chemical preservative or a natural preservative.

27. A protein beverage concentrated syrup in accordance with claim 26, wherein said chemical preservative is a sorbate or a benzoate and said natural preservative is nisin or natamycin.

28. A protein beverage concentrated syrup in accordance with claim 4, wherein said protein beverage is a meal replacement.

29. A protein beverage concentrated syrup in accordance with claim 1, wherein said protein beverage concentrated syrup may be used by an individual, in a food services beverage dispenser, or in a bottling plant.

30. A protein beverage concentrated syrup in accordance with claim 1, wherein said protein beverage concentrated syrup is dried to form a protein juice beverage concentrated powder by lyophilization (freeze drying), spray drying, fluid bed drying, drum drying, or combinations thereof.

31. A protein beverage concentrated syrup in accordance with claim 30, wherein said protein juice beverage concentrated powder is diluted with a liquid to prepare a protein beverage suitable for human consumption.

32. A protein beverage concentrated syrup in accordance with claim 31, wherein said liquid is water, fruit juice, vegetable juice, tea, alcohol, coffee, milk, soy milk, rice milk, almond milk, or combinations thereof.

33. A protein beverage concentrated syrup in accordance with claim 31, wherein said liquid contains carbonation.

34. A protein beverage concentrated syrup in accordance with claim 31, wherein said protein beverage contains carbonation.

35. A protein beverage concentrated powder composition suitable for reconstitution to generate a beverage suitable for human consumption, comprising:
  about 0% by weight to about 100% by weight juice in the form of a dried juice powder concentrate;
  about 0.05% by weight to about 90% by weight protein, wherein said protein is essentially free of lactose; and
  wherein said protein beverage concentrated powder is essentially free of lactose; and
  wherein said protein beverage concentrated powder may be diluted with a liquid to prepare a protein beverage suitable for human consumption and wherein said protein beverage concentrated powder may be used by an individual, in a food services beverage dispenser, or in a bottling plant.

36. A protein beverage concentrated powder in accordance with claim 35, wherein said liquid is water, fruit juice, vegetable juice, tea, alcohol, coffee, milk, soy milk, rice milk, almond milk, or combinations thereof.

37. A protein beverage concentrated powder in accordance with claim 35, wherein said liquid contains carbonation.

38. A protein beverage concentrated powder in accordance with claim 35, wherein said protein beverage contains carbonation.

39. A protein beverage concentrated powder in accordance with claim 38, wherein said carbonation of said protein beverage ranges from about 1.6 volumes to about 3.5 volumes per volume of protein beverage.

40. A protein beverage concentrated powder in accordance with claim 35, wherein said weight percent of protein present in said protein beverage concentrated powder ranges from about 45% by weight to about 90% by weight.

41. A protein beverage concentrated powder in accordance with claim 35, wherein said weight percent of protein present in said protein beverage ranges from 0.01% by weight to about 15% by weight.

42. A protein beverage concentrated powder in accordance with claim 41, wherein said weight percent of protein present in said protein beverage ranges from 2% by weight to about 15% by weight.

43. A protein beverage concentrated powder in accordance with claim 42, wherein said weight percent of protein present in said protein beverage ranges from 3% by weight to about 10% by weight.

44. A protein beverage concentrated powder in accordance with claim 35, wherein said weight percent of juice present in said protein beverage concentrated powder ranges from 0% by weight to about 50% by weight.

45. A protein beverage concentrated powder in accordance with claim 35, wherein said weight percent of juice present in said protein beverage ranges from 0% by weight to about 30% by weight.

46. A protein beverage concentrated powder in accordance with claim 35, wherein said dried juice powder concentrate is dried fruit juice powder concentrate or dried vegetable juice powder concentrate.

47. A protein beverage concentrated powder in accordance with claim 35, wherein said protein is derived from whey protein, casein, lactalbumin, serum albumin, glycomacropeptide, soy protein, rice protein, pea protein, canola protein, wheat protein, hemp protein, zein, flax protein, egg white protein, ovalbumin, gelatin protein, or combinations thereof.

48. A protein beverage concentrated powder in accordance with claim 47, wherein said protein is derived from whey protein.

49. A protein beverage concentrated powder in accordance with claim 48, wherein said whey protein is derived from whey protein isolate, whey protein concentrate, whey protein hydrolysate, or combinations thereof.

50. A protein beverage concentrated powder in accordance with claim 35, wherein said protein beverage exhibits a pH ranging from about 2.0 to about 3.4.

51. A protein beverage concentrated powder in accordance with claim 35, wherein said beverage exhibits a pH ranging from about 3.0 to about 3.2.

52. A protein beverage concentrated powder in accordance with claim 35, further comprising about 0% by weight to about 100% by weight filler.

53. A protein beverage concentrated syrup in accordance with claim 52, wherein said filler comprises at least one additional ingredient selected from the group including a sweetener, a flavoring agent, a coloring agent, an anti-foaming agent, a nutrient, calcium or a calcium derivative, an energy-generating additive, an herbal supplement, a concentrated plant extract, and a preservative.

54. A protein beverage concentrated powder in accordance with claim 53, wherein said energy generating additive is caffeine, citrulline malate, a magnesium-containing compound, or a combination thereof.

55. A protein beverage concentrated powder in accordance with claim 53, wherein said preservative is a chemical or a natural preservative.

56. A protein beverage concentrated powder in accordance with claim 55, wherein said chemical preservative is a sorbate or a benzoate and said natural preservative is nisin or natamycin.

57. A protein beverage concentrated powder in accordance with claim 35, wherein said protein beverage is a meal replacement.

58. A method of making a protein beverage concentrated syrup composition suitable for dilution to generate a beverage suitable for human consumption, comprising:
   admixing a juice concentrate having a Brix value of about 20° Brix to about 75° Brix, to achieve a percent by weight of juice concentrate of about 0% by weight to about 60% by weight and a protein, wherein said protein is essentially free of lactose, to achieve a percent by weight of protein in the admixture of about 10% by weight to about 75% by weight, thereby obtaining an admixture; and
   wherein said protein beverage concentrated syrup is essentially free of lactose; and
   packaging said protein beverage concentrated syrup in a container which may be stored at room temperature.

59. A method of making a protein beverage concentrated syrup in accordance with claim 58, wherein said protein beverage concentrated syrup ranges from about a two-fold syrup to about a twenty-five-fold syrup.

60. A method of making a protein beverage concentrated syrup in accordance with claim 59, wherein said protein beverage concentrated syrup is about a five-fold syrup.

61. A method of making a protein beverage concentrated syrup in accordance with claim 60, wherein one part of said protein beverage concentrated syrup is diluted with four parts liquid to prepare a protein beverage suitable for human consumption.

62. A method of making a protein beverage concentrated syrup in accordance with claim 61, wherein said liquid is water, fruit juice, vegetable juice, tea, alcohol, coffee, milk, soy milk, rice milk, almond milk, or combinations thereof.

63. A method of making a protein beverage concentrated syrup in accordance with claim 61, wherein said liquid contains carbonation.

64. A method of making a protein beverage concentrated syrup in accordance with claim 61, wherein said protein beverage contains carbonation.

65. A method of making a protein beverage concentrated syrup in accordance with claim 64, wherein said carbonation of said protein beverage ranges from about 1.6 volumes to about 3.5 volumes per volume of protein beverage.

66. A method of making a protein beverage concentrated syrup in accordance with claim 58, comprising:
   admixing a juice concentrate having a Brix value of about 60° Brix to about 70° Brix, to achieve a percent by weight of juice concentrate of about 10% by weight to about 15% by weight and a protein to achieve a percent by weight of protein in the admixture of about 10% by weight to about 40% by weight, thereby obtaining an admixture.

67. A method of making a protein beverage concentrated syrup in accordance with claim 58, comprising:
   admixing a juice concentrate having a Brix value of about 40° Brix to about 50° Brix, to achieve a percent by weight of juice concentrate of about 40% by weight to about 60% by weight and a protein to achieve a percent by weight of protein in the admixture of about 10% by weight to about 40% by weight, thereby obtaining an admixture.

68. A method of making a protein beverage concentrated syrup in accordance with claim 58, comprising:
   admixing a juice concentrate to achieve a percent by weight of juice concentrate of about 0% by weight and a protein to achieve a percent by weight of protein in the admixture of about 0.05% by weight to about 40% by weight, thereby obtaining an admixture.

69. A method of making a protein beverage concentrated syrup in accordance with claim 61, wherein said weight percent of protein present in said protein beverage ranges from 2% by weight to about 8% by weight.

70. A method of making a protein beverage concentrated syrup in accordance with claim 69, wherein said weight percent of protein present in said protein beverage ranges from 1.6% by weight to about 4% by weight.

71. A method of making a protein beverage concentrated syrup in accordance with claim 61, wherein said weight percent of juice present in said protein beverage ranges from 2% by weight to about 20% by weight.

72. A method of making a protein beverage concentrated syrup in accordance with claim 71, wherein said weight percent of juice present in said protein beverage ranges from 10% by weight to about 20% by weight.

73. A method of making a protein beverage concentrated syrup in accordance with claim 58, wherein said juice is fruit juice or vegetable juice.

74. A method of making a protein beverage concentrated syrup in accordance with claim 58, wherein said protein is derived from whey protein, casein, lactalbumin, serum albumin, glycomacropeptide, soy protein, rice protein, pea protein, canola protein, wheat protein, hemp protein, zein, flax protein, egg white protein, ovalbumin, gelatin protein, or combinations thereof.

75. A method of making a protein beverage concentrated syrup in accordance with claim 74, wherein said protein is derived from whey protein.

76. A method of making a protein beverage concentrated syrup in accordance with claim 75, wherein said whey protein is derived from whey protein isolate, whey protein concentrate, whey protein hydrolysate, or combinations thereof.

77. A method of making a protein beverage concentrated syrup in accordance with claim 61, wherein said protein beverage exhibits a pH ranging from about 2.0 to about 3.4.

78. A method of making a protein beverage concentrated syrup in accordance with claim 77, wherein said beverage exhibits a pH ranging from about 3.0 to about 3.2.

79. A method of making a protein beverage concentrated syrup in accordance with claim 58, wherein said protein beverage concentrated syrup is treated for the inactivation of microbes by pasteurization, aseptic packaging, carbonation, ozonation, radiation, ultra violet light, high pressure processing, membrane permeation, pulsed electric field, sonication, or combinations thereof.

80. A method of making a protein beverage concentrated syrup in accordance with claim 58, further comprising admixing a filler to achieve a percent by weight of filler in the admixture of about 0% by weight to about 100%.

81. A method of making a protein beverage concentrated syrup in accordance with claim 80, wherein said filler comprises at least one additional ingredient selected from the group including water, a sweetener, a flavoring agent, a coloring agent, an anti-foaming agent, a nutrient, calcium or a calcium derivative, an energy-generating additive, an herbal supplement, a concentrated plant extract, and a preservative.

82. A method of making a protein beverage concentrated syrup in accordance with claim 81, wherein said energy generating additive is caffeine, citrulline malate, a magnesium-containing compound, or a combination thereof.

83. A method of making a protein beverage concentrated syrup in accordance with claim 81, wherein said preservative is a chemical preservative or a natural preservative.

84. A method of making a protein beverage concentrated syrup in accordance with claim 83, wherein said chemical preservative is a sorbate or a benzoate and said natural preservative is nisin or natamycin.

85. A method of making a protein beverage concentrated syrup in accordance with claim 61, wherein said protein beverage is a meal replacement.

86. A method of making a protein beverage concentrated syrup in accordance with claim 58, wherein said protein beverage concentrated syrup may be used by an individual, in a food services beverage dispenser, or in a bottling plant.

87. A method of making a protein beverage concentrated syrup in accordance with claim 58, wherein said protein beverage concentrated syrup is dried to form a protein juice beverage concentrated powder by lyophilization (freeze drying), spray drying, fluid bed drying, drum drying, or combinations thereof.

88. A method of making a protein beverage concentrated syrup in accordance with claim 87, wherein said protein juice beverage concentrated powder is diluted with a liquid to prepare a protein beverage suitable for human consumption.

89. A method of making a protein beverage concentrated syrup in accordance with claim 88, wherein said liquid is water, fruit juice, vegetable juice, tea, alcohol, coffee, milk, soy milk, rice milk, almond milk, or combinations thereof.

90. A method of making a protein beverage concentrated syrup in accordance with claim 88, wherein said liquid contains carbonation.

91. A method of making a protein beverage concentrated syrup in accordance with claim 88, wherein said protein beverage contains carbonation.

92. A method of making a protein beverage concentrated powder composition suitable for reconstitution to generate a beverage suitable for human consumption, comprising:
admixing a dried juice powder concentrate to achieve a percent by weight of juice concentrate of about 0% by weight to about 100% by weight and a protein, wherein said protein is essentially free of lactose, to achieve a percent by weight of protein in the admixture of about 0.05% by weight to about 90% by weight, thereby obtaining an admixture,
wherein said protein beverage concentrated powder is essentially free of lactose and hydrolyzed lactose; and
wherein said protein beverage concentrated powder is suitable for dilution with a liquid to prepare a protein beverage suitable for human consumption and wherein said protein beverage concentrated powder may be used by an individual, in a food services beverage dispenser, or in a bottling plant.

93. A method of making a protein beverage concentrated powder in accordance with claim 92, wherein said liquid is water, fruit juice, vegetable juice, tea, alcohol, coffee, milk, soy milk, rice milk, almond milk, or combinations thereof.

94. A method of making a protein beverage concentrated powder in accordance with claim 92, wherein said liquid contains carbonation.

95. A method of making a protein beverage concentrated powder in accordance with claim 92, wherein said protein beverage contains carbonation.

96. A method of making a protein beverage concentrated powder in accordance with claim 95, wherein said carbonation of said protein beverage ranges from about 1.6 volumes to about 3.5 volumes per volume of protein beverage.

97. A method of making a protein beverage concentrated powder in accordance with claim 92, wherein said weight percent of protein present in said protein beverage concentrated powder ranges from about 45% by weight to about 90% by weight.

98. A method of making a protein beverage concentrated powder in accordance with claim 92, wherein said weight percent of protein present in said protein beverage ranges from 0.01% by weight to about 15% by weight.

99. A method of making a protein beverage concentrated powder in accordance with claim 98, wherein said weight percent of protein present in said protein beverage ranges from 2% by weight to about 15% by weight.

100. A method of making a protein beverage concentrated powder in accordance with claim 99, wherein said weight percent of protein present in said protein beverage ranges from 3% by weight to about 10% by weight.

101. A method of making a protein beverage concentrated powder in accordance with claim 92, wherein said weight percent of juice present in said protein beverage concentrated powder ranges from 0% by weight to about 50% by weight.

102. A method of making a protein beverage concentrated powder in accordance with claim 91, wherein said weight percent of juice present in said protein beverage ranges from 0% by weight to about 30% by weight.

103. A method of making a protein beverage concentrated powder in accordance with claim 92, wherein said dried juice powder concentrate is dried fruit juice powder concentrate or dried vegetable juice powder concentrate.

104. A method of making a protein beverage concentrated powder in accordance with claim 92, wherein said protein is derived from whey protein, casein, lactalbumin, serum albumin, glycomacropeptide, soy protein, rice protein, pea protein, canola protein, wheat protein, hemp protein, zein, flax protein, egg white protein, ovalbumin, gelatin protein, or combinations thereof.

105. A method of making a protein beverage concentrated powder in accordance with claim 104, wherein said protein is derived from whey protein.

106. A method of making a protein beverage concentrated powder in accordance with claim 105, wherein said whey protein is derived from whey protein isolate, whey protein concentrate, whey protein hydrolysate, or combinations thereof.

107. A method of making a protein beverage concentrated powder in accordance with claim 92, wherein said protein beverage exhibits a pH ranging from about 2.0 to about 3.4.

108. A method of making a protein beverage concentrated powder in accordance with claim 92, wherein said beverage exhibits a pH ranging from about 3.0 to about 3.2.

109. A method of making a protein beverage concentrated powder in accordance with claim 92, further comprising admixing a filler to achieve a percent by weight of filler of about 0% by weight to about 100% by weight.

110. A method of making a protein beverage concentrated syrup in accordance with claim 109, wherein said filler comprises at least one additional ingredient selected from the group including a sweetener, a flavoring agent, a coloring agent, an anti-foaming agent, a nutrient, calcium or a calcium derivative, an energy-generating additive, an herbal supplement, a concentrated plant extract, and a preservative.

111. A method of making a protein beverage concentrated powder in accordance with claim 110, wherein said energy generating additive is caffeine, citrulline malate, a magnesium-containing compound, or a combination thereof.

112. A method of making a protein beverage concentrated powder in accordance with claim 110, wherein said preservative is a chemical or a natural preservative.

113. A method of making a protein beverage concentrated powder in accordance with claim 110, wherein said chemical preservative is a sorbate or a benzoate and said natural preservative is nisin or natamycin.

114. A method of making a protein beverage concentrated powder in accordance with claim 92, wherein said protein beverage is a meal replacement.

115. A protein beverage concentrated syrup composition suitable for dilution to generate a beverage suitable for human consumption, comprising:
  about 0% by weight to about 60% by weight juice concentrate, wherein said juice concentrate has a Brix value of about 20° Brix to about 75° Brix;
  about 0.05% by weight to about 75% by weight protein, wherein said protein is essentially free of lactose; and
  wherein said protein beverage concentrated syrup is essentially free of lactose; and
  wherein both, at the time of packaging of the protein beverage concentrated syrup and during subsequent storage without refrigeration, substantial solubility of the protein is maintained in the protein beverage concentrated syrup, and wherein said protein beverage concentrated syrup is essentially free of pathogenic microbes known to be harmful to human health, both at the time of packaging of the protein beverage concentrated syrup and during subsequent storage.

116. A method of making a protein beverage concentrated syrup composition suitable for dilution to generate a beverage suitable for human consumption, comprising:
  admixing a juice concentrate having a Brix value of about 20° Brix to about 90° Brix, to achieve a percent by weight of juice concentrate of about 0% by weight to about 60% by weight and a protein, wherein said protein is essentially free of lactose, to achieve a percent by weight of protein in the admixture of about 0.05% by weight to about 75% by weight, thereby obtaining an admixture; and
  wherein said protein beverage concentrated syrup is essentially free of lactose; and
  packaging said protein beverage concentrated syrup in a container which may be stored at room temperature.

* * * * *

UNITED STATES PATENT AND TRADEMARK OFFICE
CERTIFICATE OF CORRECTION

PATENT NO. : 7,799,363 B2
APPLICATION NO. : 11/683380
DATED : September 21, 2010
INVENTOR(S) : Shawn Sherwood, David A. Jenkins and Steven A. Rittmanic It is certified that error appears in the above-identified patent and that said Letters Patent is hereby corrected as shown below:

Claim 1, column 28, lines 2 and 3, delete "and hydrolyzed lactose"

Claim 92, column 34, line 22, delete "and hydrolyzed lactose"

Signed and Sealed this

Sixteenth Day of November, 2010

David J. Kappos
*Director of the United States Patent and Trademark Office*